US012583363B2

(12) United States Patent
Farber et al.

(10) Patent No.: US 12,583,363 B2
(45) Date of Patent: Mar. 24, 2026

(54) ELECTRIC VEHICLE EMPLOYING FUEL CELLS AND RECHARGEABLE BATTERIES

(71) Applicant: Wiggins Lift Co., Inc., Oxnard, CA (US)

(72) Inventors: Bruce Farber, Oxnard, CA (US); Chase Menen, Oxnard, CA (US)

(73) Assignee: WIGGINS LIFT CO., INC., Oxnard, CA (US)

( * ) Notice: Subject to any disclaimer, the term of this patent is extended or adjusted under 35 U.S.C. 154(b) by 50 days.

(21) Appl. No.: 18/632,783

(22) Filed: Apr. 11, 2024

(65) Prior Publication Data

US 2024/0262255 A1     Aug. 8, 2024

Related U.S. Application Data

(63) Continuation-in-part of application No. 18/069,524, filed on Dec. 21, 2022, now abandoned.

(51) Int. Cl.
B60L 58/40          (2019.01)
B60L 1/00           (2006.01)
(Continued)

(52) U.S. Cl.
CPC .............. B60L 58/40 (2019.02); B60L 1/003 (2013.01); B60L 50/75 (2019.02); B60L 58/13 (2019.02);
(Continued)

(58) Field of Classification Search
None
See application file for complete search history.

(56) References Cited

U.S. PATENT DOCUMENTS

| | | | |
|---|---|---|---|
| 5,332,630 | A | 7/1994 | Hsu |
| 6,945,345 | B2 | 9/2005 | Meany, Jr. |

(Continued)

FOREIGN PATENT DOCUMENTS

| | | |
|---|---|---|
| CN | 212649181 U | 3/2021 |
| KR | 10-2352048 B1 | 1/2022 |
| WO | 2018138424 A1 | 8/2018 |

OTHER PUBLICATIONS

Casey, Tina, Hydrogen Fuel Cell Truck Is Here To Help EV Batteries, Not Harm Them, CleanTechnica, Jul. 11, 2022, pp. 1-6, retrieved from https://cleantechnica.com/2022/07/11/hydrogen-fuel-cell-truck-is-here-to-help-ev-batteries-not-harm-them/.

(Continued)

*Primary Examiner* — Daniel Cavallari
*Assistant Examiner* — Joel Barnett
(74) *Attorney, Agent, or Firm* — LYON & HARR, LLP; Richard T. Lyon

(57)          ABSTRACT

An electric vehicle is described that has fuel cells and rechargeable batteries. The fuel cells are sized to produce an electric power output within their peak fuel efficiency range approximately equal to an anticipated average electric power requirement of the electric vehicle over a projected work cycle. The rechargeable batteries are sized to provide electric power up to the anticipated maximum power draw over the anticipated work cycle. An electrical vehicle controller operates the fuel cells within their highest fuel efficiency range during normal operations and maintains the battery state of charge in an optimal longevity range using a portion of the output of the fuel cells. The batteries are employed to handle short-term power requirements that exceed the output of the fuel cells.

15 Claims, 13 Drawing Sheets

(51) Int. Cl.

| | |
|---|---|
| *B60L 50/75* | (2019.01) |
| *B60L 58/13* | (2019.01) |
| *B60L 58/24* | (2019.01) |
| *B60L 58/32* | (2019.01) |
| *H01M 8/04082* | (2016.01) |
| *H01M 8/0432* | (2016.01) |
| *H01M 8/04537* | (2016.01) |
| *H01M 10/46* | (2006.01) |
| *H01M 10/48* | (2006.01) |
| *H01M 10/613* | (2014.01) |
| *H01M 10/615* | (2014.01) |
| *H01M 10/625* | (2014.01) |
| *H01M 16/00* | (2006.01) |
| *H02J 7/00* | (2026.01) |
| *H02J 7/34* | (2006.01) |

(52) U.S. Cl.
CPC .............. *B60L 58/24* (2019.02); *B60L 58/32* (2019.02); *H01M 8/04201* (2013.01); *H01M 8/0432* (2013.01); *H01M 8/04619* (2013.01); *H01M 10/46* (2013.01); *H01M 10/482* (2013.01); *H01M 10/486* (2013.01); *H01M 10/613* (2015.04); *H01M 10/615* (2015.04); *H01M 10/625* (2015.04); *H01M 16/006* (2013.01); *H02J 7/34* (2013.01); *H02J 7/855* (2026.01); *H01M 2220/20* (2013.01); *H01M 2250/20* (2013.01); *H01M 2250/402* (2013.01)

(56) References Cited

U.S. PATENT DOCUMENTS

| | | | |
|---|---|---|---|
| 2002/0192519 A1 | 12/2002 | Fujita | |
| 2005/0076075 A1* | 4/2005 | Takase .............. | H01M 8/04567 |
| | | | 708/838 |
| 2008/0152959 A1* | 6/2008 | Schumer .......... | H01M 8/04619 |
| | | | 429/428 |
| 2011/0061957 A1 | 3/2011 | Hargett | |
| 2013/0220714 A1* | 8/2013 | Rudinec ................... | B60L 7/14 |
| | | | 180/65.1 |
| 2016/0114690 A1* | 4/2016 | Matsubara ............. | B60L 58/40 |
| | | | 307/10.1 |
| 2018/0134173 A1* | 5/2018 | Takebayashi ......... | G01R 31/36 |
| 2019/0067945 A1* | 2/2019 | Hierl ........................ | H02J 3/46 |
| 2020/0164854 A1 | 5/2020 | Obata | |
| 2021/0394914 A1 | 12/2021 | Morrison | |
| 2022/0105793 A1* | 4/2022 | Sukhatankar ........ | B60W 30/19 |
| 2022/0299337 A1 | 9/2022 | Joao | |
| 2022/0379742 A1 | 12/2022 | Bang | |

OTHER PUBLICATIONS

American Journal of Transportation, Hyster begins first-ever, real-world pilot of hydrogen fuel cell-powered container handler at CMA CGM-owned Fenix Marine terminal in the Port of Los Angeles, Oct. 12, 2022, retrieved from https://ajot.com/news/hyster-begins-first-ever-real-world-pilot-of-hydrogen-fuel-cell-powered-container-handler-at-cma-cgm-owned-fenix-marine-terminal-in-the-port-of-los-angeles.

Arciero, Adam, Office Action, U.S. Appl. No. 18/069,524, Sep. 22, 2023, pp. 1-11.

Arciero, Adam, Final Office Action, U.S. Appl. No. 18/069,524, Dec. 12, 2023, pp. 1-14.

Arciero, Adam, Advisory Action, U.S. Appl. No. 18/069,524, Mar. 15, 2024, pp. 1-3.

* cited by examiner

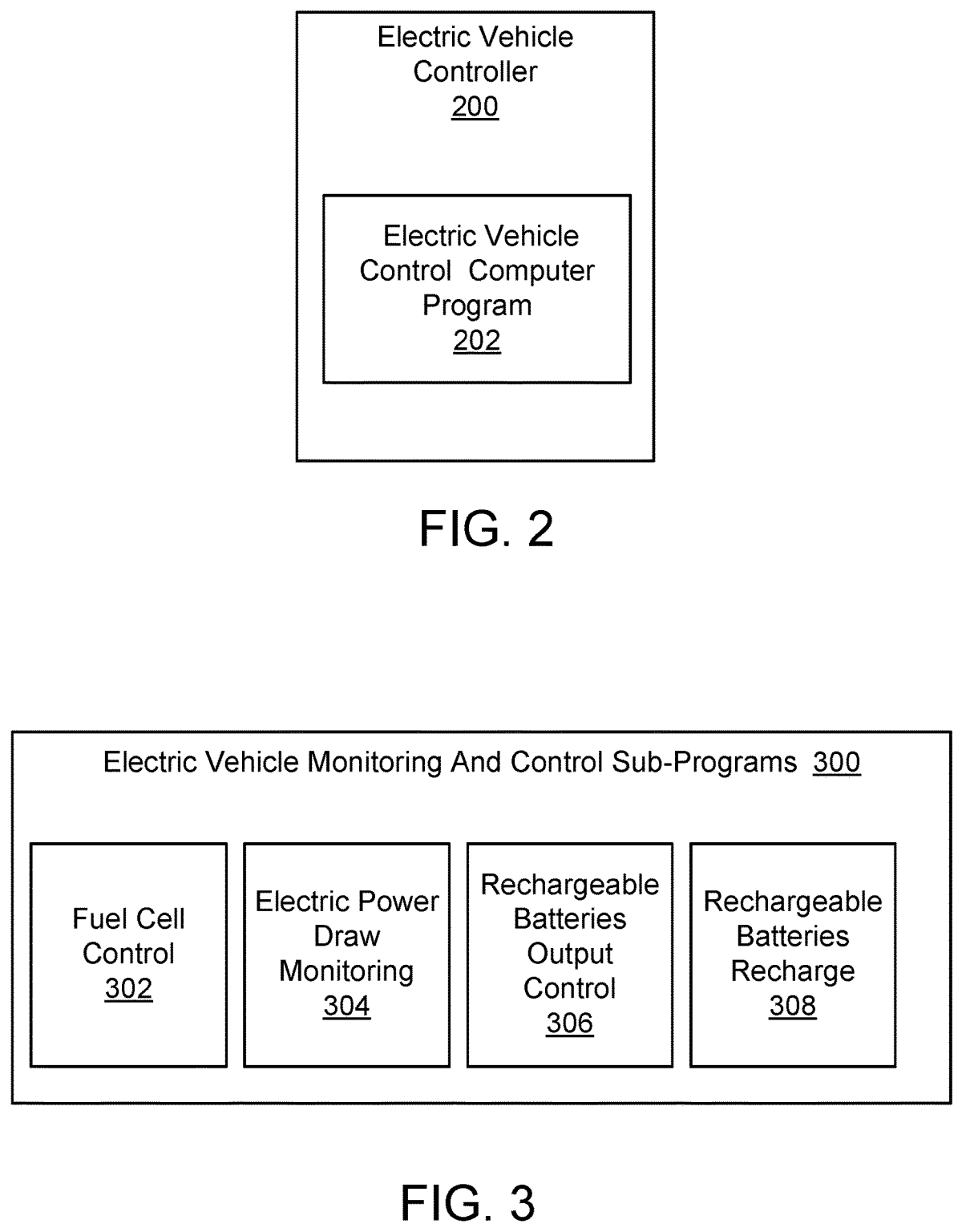

Electric Vehicle
Controller
200

Electric Vehicle
Control  Computer
Program
202

FIG. 2

Electric Vehicle Monitoring And Control Sub-Programs  300

Fuel Cell
Control
302

Electric Power
Draw
Monitoring
304

Rechargeable
Batteries
Output
Control
306

Rechargeable
Batteries
Recharge
308

FIG. 3

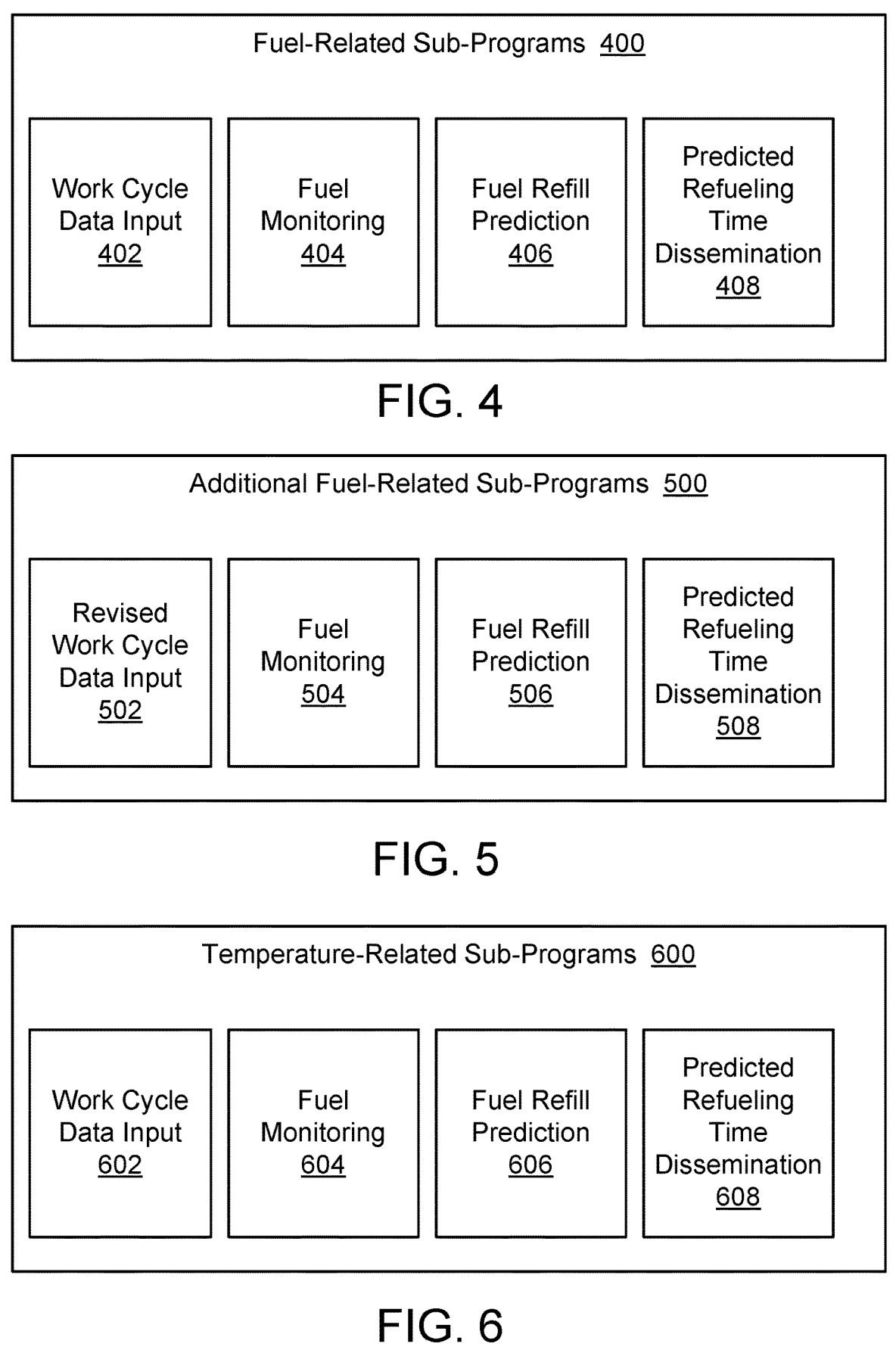

Fuel-Related Sub-Programs  400

| Work Cycle Data Input 402 | Fuel Monitoring 404 | Fuel Refill Prediction 406 | Predicted Refueling Time Dissemination 408 |

FIG. 4

Additional Fuel-Related Sub-Programs  500

| Revised Work Cycle Data Input 502 | Fuel Monitoring 504 | Fuel Refill Prediction 506 | Predicted Refueling Time Dissemination 508 |

FIG. 5

Temperature-Related Sub-Programs  600

| Work Cycle Data Input 602 | Fuel Monitoring 604 | Fuel Refill Prediction 606 | Predicted Refueling Time Dissemination 608 |

FIG. 6

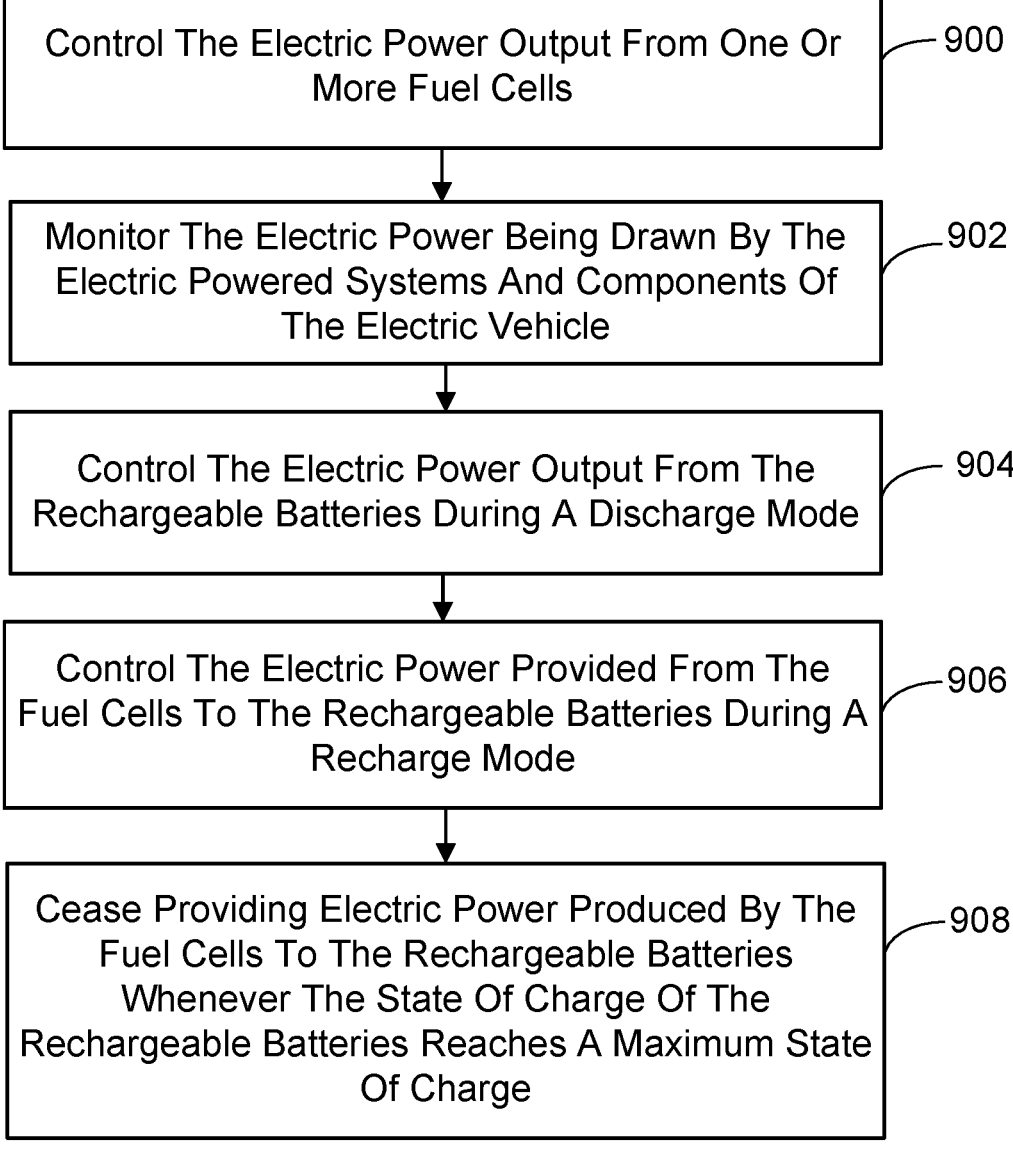

Control The Electric Power Output From One Or More Fuel Cells — 900

Monitor The Electric Power Being Drawn By The Electric Powered Systems And Components Of The Electric Vehicle — 902

Control The Electric Power Output From The Rechargeable Batteries During A Discharge Mode — 904

Control The Electric Power Provided From The Fuel Cells To The Rechargeable Batteries During A Recharge Mode — 906

Cease Providing Electric Power Produced By The Fuel Cells To The Rechargeable Batteries Whenever The State Of Charge Of The Rechargeable Batteries Reaches A Maximum State Of Charge — 908

FIG. 9

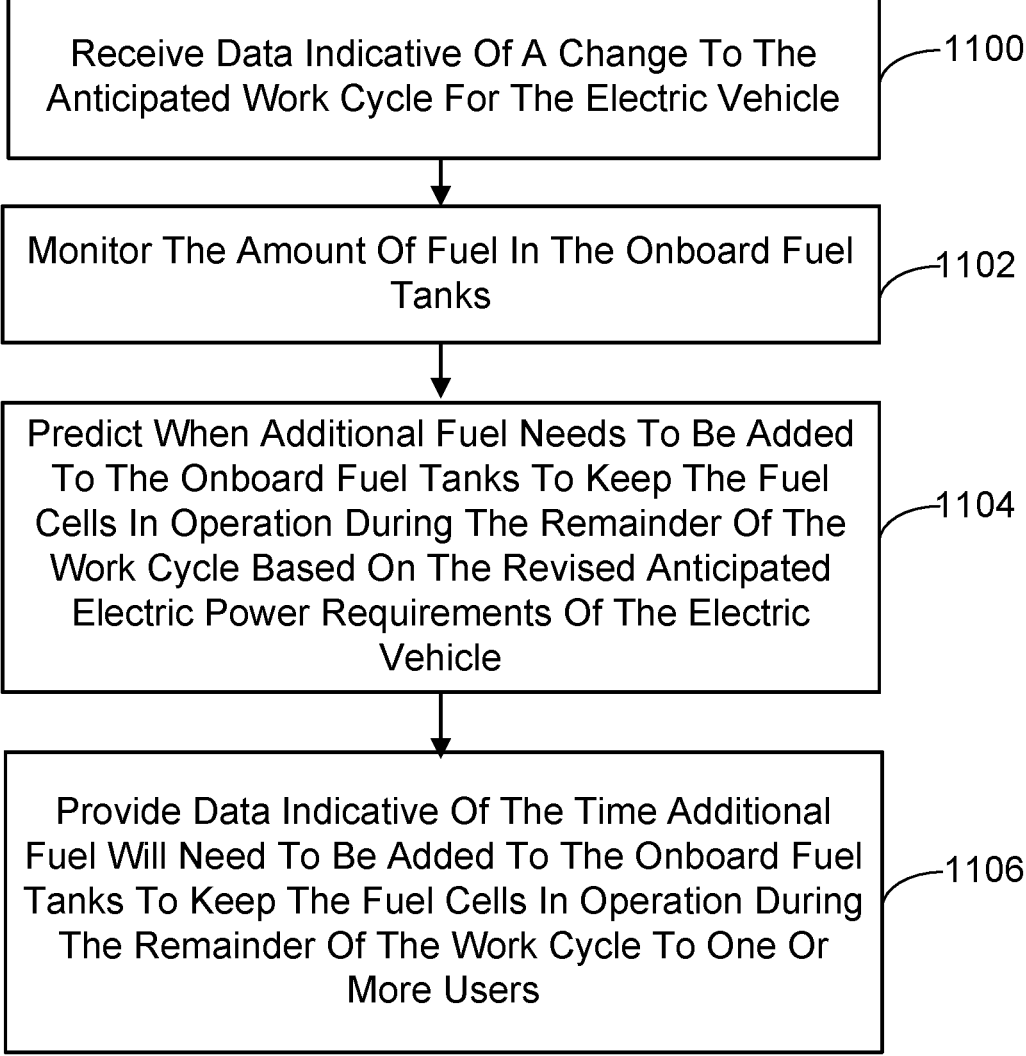

Receive Data Indicative Of A Change To The Anticipated Work Cycle For The Electric Vehicle — 1100

Monitor The Amount Of Fuel In The Onboard Fuel Tanks — 1102

Predict When Additional Fuel Needs To Be Added To The Onboard Fuel Tanks To Keep The Fuel Cells In Operation During The Remainder Of The Work Cycle Based On The Revised Anticipated Electric Power Requirements Of The Electric Vehicle — 1104

Provide Data Indicative Of The Time Additional Fuel Will Need To Be Added To The Onboard Fuel Tanks To Keep The Fuel Cells In Operation During The Remainder Of The Work Cycle To One Or More Users — 1106

FIG. 11

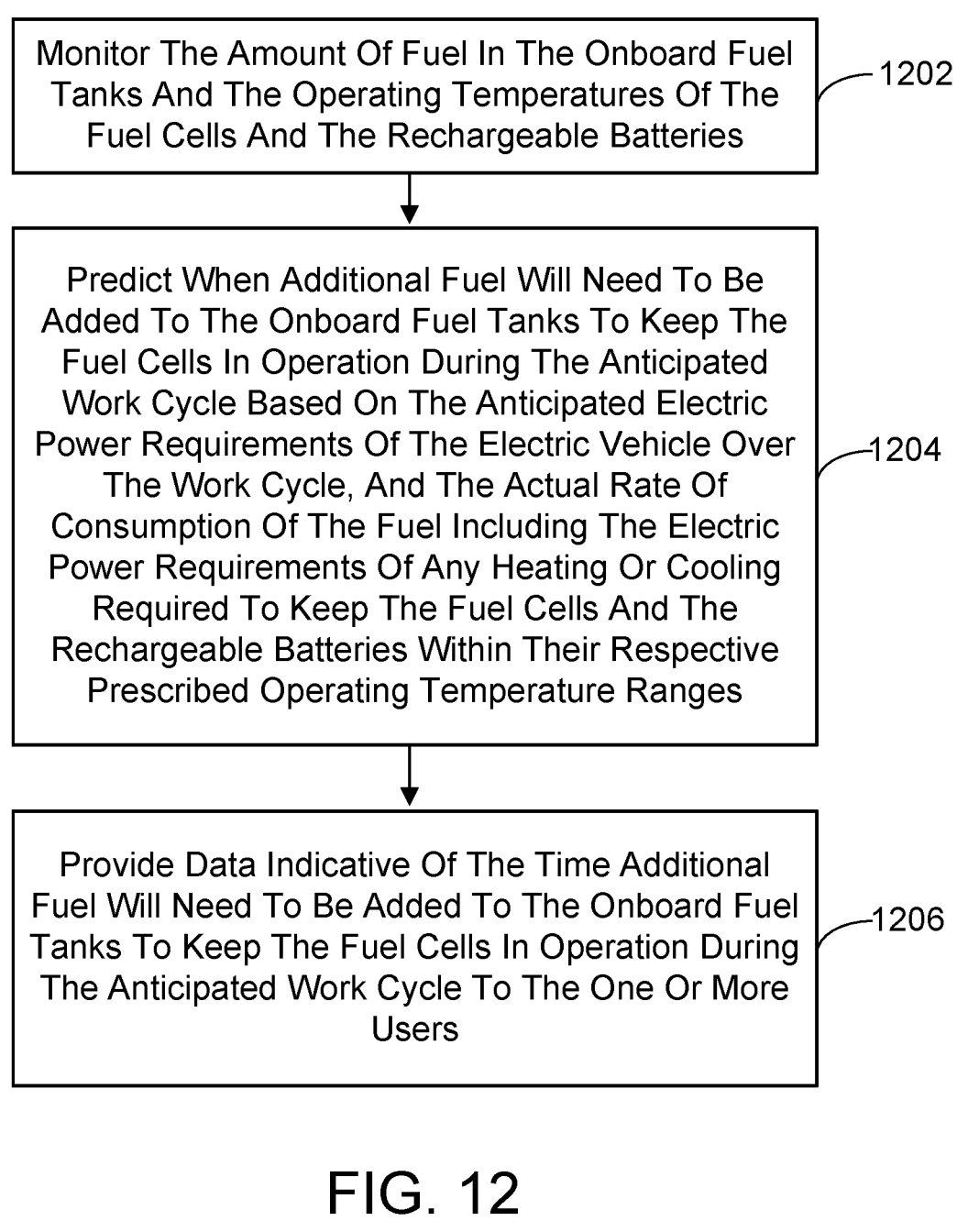

Monitor The Amount Of Fuel In The Onboard Fuel Tanks And The Operating Temperatures Of The Fuel Cells And The Rechargeable Batteries ⟋ 1202

Predict When Additional Fuel Will Need To Be Added To The Onboard Fuel Tanks To Keep The Fuel Cells In Operation During The Anticipated Work Cycle Based On The Anticipated Electric Power Requirements Of The Electric Vehicle Over The Work Cycle, And The Actual Rate Of Consumption Of The Fuel Including The Electric Power Requirements Of Any Heating Or Cooling Required To Keep The Fuel Cells And The Rechargeable Batteries Within Their Respective Prescribed Operating Temperature Ranges ⟋ 1204

Provide Data Indicative Of The Time Additional Fuel Will Need To Be Added To The Onboard Fuel Tanks To Keep The Fuel Cells In Operation During The Anticipated Work Cycle To The One Or More Users ⟋ 1206

FIG. 12

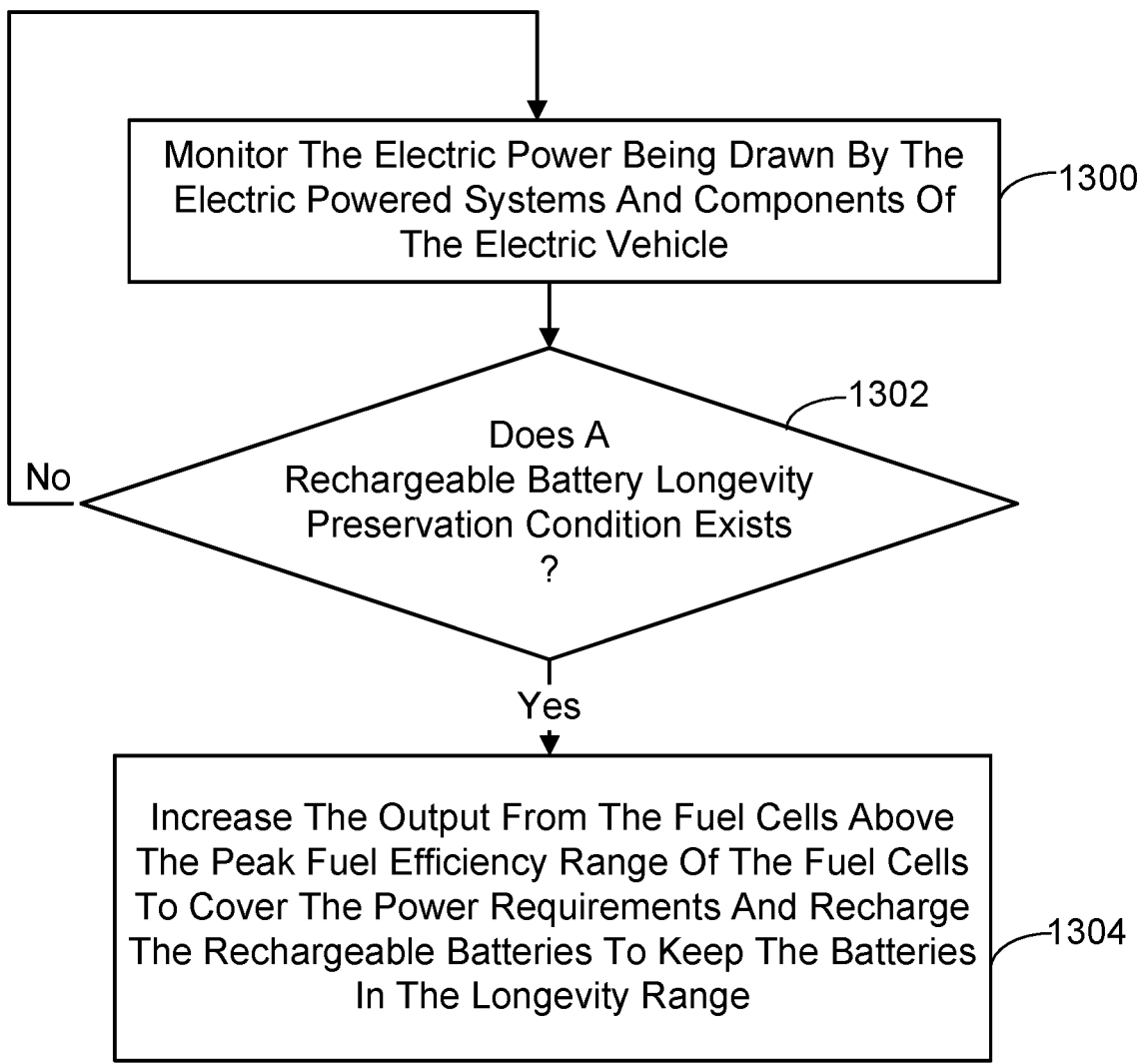

Monitor The Electric Power Being Drawn By The Electric Powered Systems And Components Of The Electric Vehicle — 1300

Does A Rechargeable Battery Longevity Preservation Condition Exists ? — 1302

No

Yes

Increase The Output From The Fuel Cells Above The Peak Fuel Efficiency Range Of The Fuel Cells To Cover The Power Requirements And Recharge The Rechargeable Batteries To Keep The Batteries In The Longevity Range — 1304

FIG. 13

ELECTRIC VEHICLE EMPLOYING FUEL CELLS AND RECHARGEABLE BATTERIES

CROSS REFERENCE TO RELATED APPLICATION

This application is a continuation-in-part of U.S. patent application Ser. No. 18/069,524 filed Dec. 21, 2022, the disclosure of which is hereby incorporated by reference.

BACKGROUND

Zero emission vehicles are non-polluting vehicles that do not emit greenhouse gases such as carbon dioxide and other pollutants. There is strong popular and political sentiment to move away from air polluting vehicles to zero emission vehicles. Many new laws and regulations are being enacted to require the shift to zero emission vehicle in the near future. For example, laws passed by the State of California legislature require new vehicles to have zero emissions by 2035. Various States are also providing incentives to purchase zero-emission heavy-duty class mobile equipment. For example, the State of California currently offers purchasing incentives for a variety of these vehicles, such as on- and off-road terminal tractors, truck- and trailer-mounted transport refrigeration units, large forklifts and cargo-handling equipment, airport ground-support equipment, and railcar movers and switcher locomotives.

Electric vehicles are a prime example of a zero-emission vehicle. Rechargeable batteries and fuel cells are two ways of powering an electric vehicle of this type.

It is noted that this background solely provides context for the disclosure to follow. It does not describe prior art related to the claims or constitute an admission of the existence of such prior art.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

In general, electric vehicle implementations described herein involve controlling the operation of the electric powered systems and components of an electric vehicle having one or more fuel cells and rechargeable batteries. In one exemplary electric vehicle implementation, these electric powered systems and components include an electric powered propulsion system that propels the electric vehicle, and a plurality of additional electric powered systems that operate non-propulsion related systems and components of the electric vehicle. In addition, the electric vehicle includes one or more fuel cells that consume a gaseous fuel stored in one or more onboard fuel tanks to produce electric energy. The fuel cell or cells are sized to be no larger than that required to produce an electric power output within the fuel cells' maximum fuel efficiency range approximately equal to an anticipated average electric power requirement of the electric vehicle over its projected work cycle. Rechargeable batteries are also included which provide electric energy during a discharge mode and store electric energy during a charging mode. These rechargeable batteries are sized to be no larger than that required to provide electric power up to approximately an anticipated maximum power draw over the anticipated work cycle of the electric vehicle. There is also an electric power distribution component included that is electrically connected to and which provides electric energy to the electric powered systems and components of the electric vehicle, the rechargeable batteries whenever the batteries are in the recharge mode, and an electric vehicle controller. Additionally, the electric power distribution component is electrically connected to and receives electric power from the fuel cells and the rechargeable batteries whenever the batteries are operating in the discharge mode. Further, a suite of sensors is included. These sensors include at least one state of charge sensor that measures the state of charge of the rechargeable batteries, and a plurality of electric power sensors that measure the amount of electric power being drawn by the electric powered systems and components of the electric vehicle and the rechargeable batteries whenever the batteries are in the recharge mode. With regard to the electric vehicle controller, it includes one or more computing devices, and an electric vehicle control computer program having a plurality of sub-programs executable by the computing device or devices. The sub-programs configure the computing device or devices to monitor the amount of electric power provided to the electric powered systems and components of the electric vehicle, and the rechargeable batteries whenever the batteries are in the recharge mode, using the output from the electric power sensors. The sub-programs also control the amount of electric power output from the fuel cells, and the rechargeable batteries whenever the batteries are in discharge mode.

In one implementation, a computer-implemented process is used to control the operation of electric powered systems and components of an electric vehicle. This process employs one or more computing devices to perform the following process actions. It is noted that the computing devices are in communication with each other whenever a plurality is used. One process action involves controlling the electric power output from one or more fuel cells that consume a gaseous fuel stored in one or more onboard fuel tanks, and which are sized to be no larger than that required to produce an electric power output within the fuel cells maximum fuel efficiency range approximately equal to an anticipated average electric power requirement of the electric vehicle over a projected work cycle of the electric vehicle. Another process action monitors the electric power being drawn by the electric powered systems and components of the electric vehicle. In addition, a process action controls the electric power output from rechargeable batteries that provide electric energy during a discharge mode and store electric energy during a charging mode, and which are sized to be no larger than that required to provide electric power up to approximately an anticipated maximum power draw over the anticipated work cycle of the electric vehicle. This control includes controlling the electric power output from the rechargeable batteries to the electric powered systems and components of the electric vehicle during times when electric power being drawn by the electric powered systems and components exceeds the electric power being provided by the fuel cells and the state of charge of the rechargeable batteries is within a prescribed range. Further, a process action is included for controlling the electric power provided from the fuel cells to the rechargeable batteries whenever the rechargeable batteries are not providing electric power to the electric powered systems and components of the electric vehicle and the state of charge of the rechargeable batteries is less than a maximum state of charge, and cease providing electric power from the fuel cells to the rechargeable batteries whenever the state of charge of the rechargeable batteries reaches the maximum state of charge.

One particular electric vehicle implementation is an electric powered material handling vehicle. This vehicle includes an electric powered propulsion system that propels the vehicle, an electric powered hydraulic system that drives hydraulic components of the vehicle, and a plurality of additional electric powered systems that operate non-propulsion related and non-hydraulics related systems and components of the vehicle. The electric powered material handling vehicle also includes one or more hydrogen fuel cells that consume hydrogen gas stored in one or more onboard fuel tanks to produce electric energy. The hydrogen fuel cell or cells are sized to be no larger than that required to produce an electric power output within the fuel cells maximum fuel efficiency range approximately equal to an anticipated average electric power requirement of the electric vehicle over its projected work cycle. In addition, rechargeable batteries are included that provide electric energy during a discharge mode and store electric energy during a charging mode. These rechargeable batteries are sized to be no larger than that required to provide electric power up to approximately an anticipated maximum power draw over the anticipated work cycle of the vehicle. An included electric power distribution component is electrically connected to and provides electric energy to the electric powered propulsion system, the electric powered hydraulic system, the additional electric powered systems, the rechargeable batteries whenever the batteries are in the recharge mode, and a vehicle controller. Additionally, the electric power distribution component is electrically connected to and receives electric power from the fuel cells, and the rechargeable batteries whenever the batteries are operating in the discharge mode. An included suite of sensors includes at least one state of charge sensor that measures the state of charge of the rechargeable batteries, and a plurality of electric power sensors that measure the amount of electric power being drawn by the electric powered propulsion system, electric powered hydraulic system, additional electric powered systems, and the rechargeable batteries whenever the batteries are in the recharge mode. The aforementioned vehicle controller includes one or more computing devices, and a vehicle control computer program having a plurality of sub-programs executable by the computing device or devices. The sub-programs configure the computing device or devices to monitor the amount of electric power provided to the electric powered propulsion system, the electric powered hydraulic system, the additional electric powered systems, and the rechargeable batteries whenever the batteries are in the recharge mode, using the output from the electric power sensors. In addition, the sub-programs control the amount of electric power output from the fuel cells, and the rechargeable batteries whenever the batteries are in discharge mode.

DESCRIPTION OF THE DRAWINGS

The specific features, aspects, and advantages of the electric vehicle implementations described herein will become better understood with regard to the following description, appended claims, and accompanying drawings where:

FIG. 2 is a diagram illustrating one implementation, in simplified form, of an electric vehicle controller and its electric vehicle computer program.

FIG. 3 is a diagram illustrating one implementation, in simplified form, of sub-programs of the electric vehicle control computer program for monitoring and controlling the electric vehicle.

FIG. 4 is a diagram illustrating one implementation, in simplified form, of fuel-related sub-programs of the electric vehicle control computer program.

FIG. 5 is a diagram illustrating one implementation, in simplified form, of additional fuel-related sub-programs of the electric vehicle control computer program.

FIG. 6 is a diagram illustrating one implementation, in simplified form, of temperature-related sub-programs of the electric vehicle control computer program.

FIG. 9 is a flow diagram illustrating an exemplary implementation, in simplified form, of a process for controlling the operation of electric powered systems and components of an electric vehicle.

FIG. 11 is a flow diagram illustrating one implementation, in simplified form, of a process for fuel monitoring and predicting when additional fuel will be needed when a change occurs in the anticipated work cycle FIG. 12 is a flow diagram illustrating one implementation, in simplified form, of a process for fuel monitoring and predicting when additional fuel will be needed when the temperature of the fuel cells and the rechargeable batteries is taken into consideration FIG. 13 is a flow diagram illustrating one implementation, in simplified form, of a process for controlling the fuel cells whenever the electric power provided by the fuel cells while operating in the peak fuel efficiency range, plus the electric power provided by the rechargeable batteries, is needed to cover the electric power requirements of the vehicle, and the state of charge of the rechargeable batteries drops to the minimum state of charge threshold within the batteries' longevity range.

DETAILED DESCRIPTION

Figure 1:
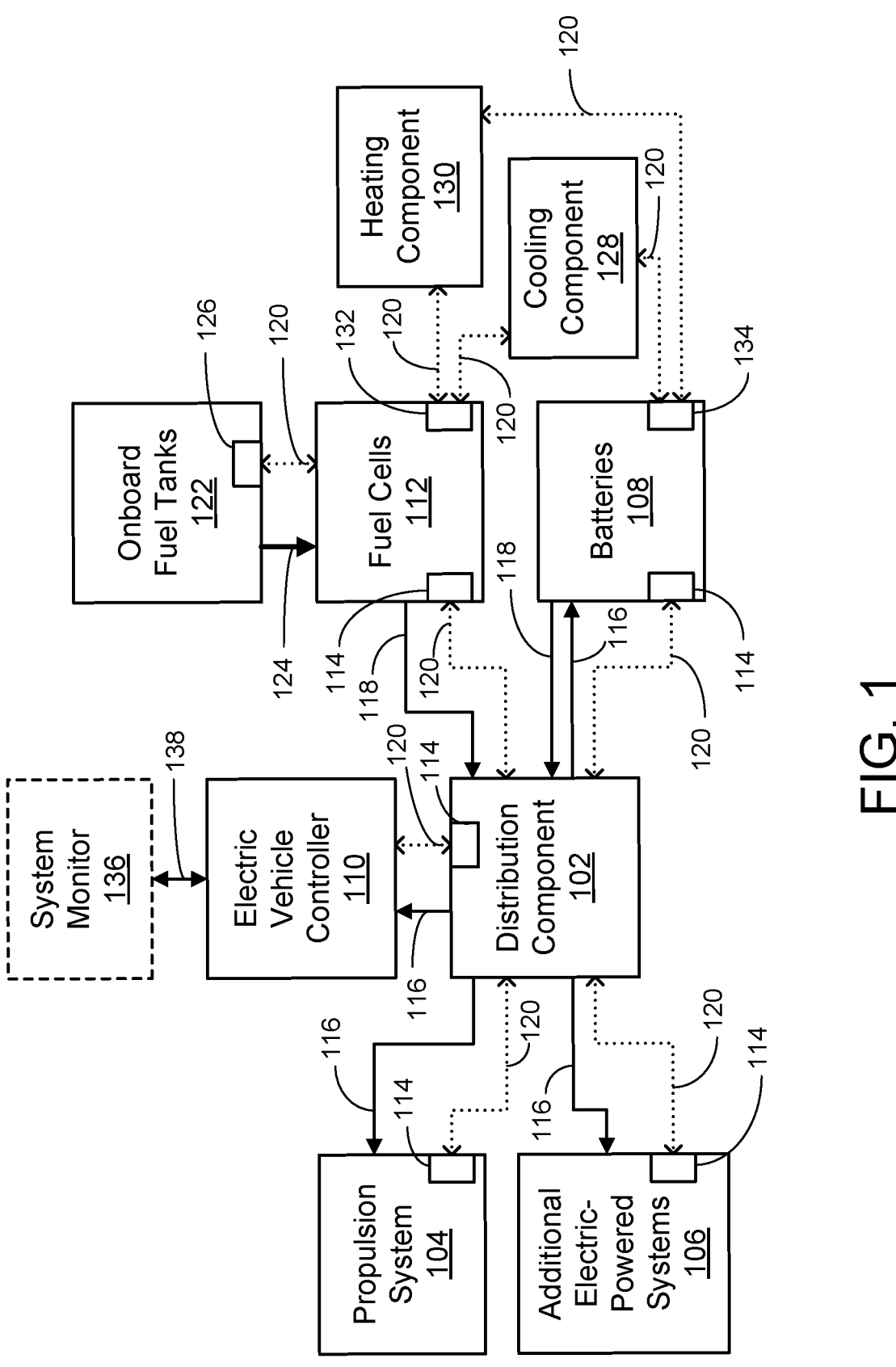
FIG. 1 is an exemplary system diagram illustrating, in simplified form, the electric vehicle implementations described herein.

In the following description reference is made to the accompanying drawings which form a part hereof, and in which are shown, by way of illustration, specific implementations in which an electric vehicle can be practiced. It is understood that other implementations can be utilized, and structural changes can be made without departing from the scope of the electric vehicle.

It is also noted that for the sake of clarity specific terminology will be resorted to in describing the electric vehicle implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "some implementations", or "one tested implementation"; or "one version", or "another version", or an "exemplary version", or an "alternate version", or "some versions", or "one tested version"; or "one variant", or "another variant", or an "exemplary variant", or an "alternate variant", or "some variants", or "one tested variant"; means that a particular feature, a particular structure, or particular characteristics described in connection with the implementation/version/variant can be included in one or more implementations of the electric vehicle. The appearances of the phrases "in one implementation", "in another implementation", "in an exemplary implementation", "in an alternate implementation", "in some implementations", "in one tested implementation"; "in one version", "in another version", "in an exemplary version", "in an alternate version", "in some versions", "in one tested version"; "in one variant", "in another variant", "in an exemplary variant", "in an alternate variant", "in some variants" and "in one tested variant"; in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants does not inherently indicate any particular order nor imply any limitations of the electric vehicle.

As utilized herein, the terms "module", "component," "system," "client" and the like can refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," and variants thereof, and other similar words are used in either this detailed description or the claims, these terms are intended to be inclusive, in a manner similar to the term "comprising", as an open transition word without precluding any additional or other elements.

1.0 Introduction

In general, the electric vehicle implementations described herein involve controlling the operation of the electric powered systems and components of an electric vehicle having fuel cells and rechargeable batteries. More particularly, one or more on-board fuel cells are integrated with rechargeable batteries. It is noted that for the sake of convenience, the term "fuel cells" will be used in this description. It is understood that this term refers to one or more fuel cells even though the term is plural.

The output of the fuel cells and the rechargeable batteries is used to power the electric vehicle, and the fuel cells are used to recharge the batteries. In addition, the fuel cells and the rechargeable batteries are sized to optimize fuel efficiency and battery longevity as will be described in more detail in the descriptions to follow. Control algorithms are also employed to optimize performance of both the battery and fuel cell systems. More particularly, a vehicle controller monitors fuel efficiency, battery state of charge and energy usage, and issues control commands to maintain all systems within desired ranges. For example, the state of charge of the batteries is controlled and managed to protect battery longevity. In one implementation using lithium-ion batteries, the battery state of charge is kept in an optimal range of 30% to 80%. If other types of batteries are employed, the optimal longevity range could be different. In addition, the fuel cells are controlled and managed to operate within their highest fuel efficiency range. In one implementation, the fuel cells will be operated at 40% to 50% of their rated power by using the batteries to handle short term power requirements that would normally require the fuel cells to operate above the desired power percentage. To accomplish the foregoing goals, in one implementation, the fuel cells are sized to provide an amount of power approximately equal to the expected average power requirements of the electric vehicle over the course of its work cycle while operating in their highest fuel efficiency range. Additionally, the batteries are sized to provide a maximum power output approximately equal to the maximum peak power requirements expected to be encountered by the electric vehicle over the course of its work cycle. In this way, the fuel cells can be operated at their peak fuel efficiency while the batteries can be maintained at a state of charge in their optimal longevity range. It is noted that, in one implementation, the term "sized" as used above in connection with the fuel cells means the fuel cells are chosen to be no larger than that required to provide an amount of power approximately equal to the expected average power requirements of the electric vehicle over the course of its work cycle while operating in their highest fuel efficiency range. The term "approximately equal" is used in recognition that fuel cells may be commercially available only in certain sizes. Thus, if this is the case, the fuel cells are chosen to be no larger than practical given the available sizes to provide the amount of power approximately equal to the expected average power requirements of the electric vehicle over the course of its work cycle while operating in their highest fuel efficiency range. Similarly, it is noted that, in one implementation, the term "sized" as used above in connection with the rechargeable batteries means the rechargeable batteries are chosen to be no larger than that required to provide a maximum power output approximately equal to the maximum peak power requirements expected to be encountered by the electric vehicle over the course of its work cycle. The term "approximately equal" is used in recognition that rechargeable batteries may be commercially available only in certain sizes. Thus, if this is the case, the rechargeable batteries are chosen to be no larger than practical given the available sizes to provide the maximum power output approximately equal to the maximum peak power requirements expected to be encountered by the electric vehicle over the course of its work cycle.

The foregoing balancing of the battery state of charge and fuel cells operating power has several advantages. For example, it is believed that using the batteries to handle peak power requirements to keep the fuel cells operating at peak fuel efficiency increases the efficiency of fuel use by 25% or more, and therefore reduces the fuel cost and reduces the frequency of refueling. This also advantageously eliminates the need for fuel throttles and techniques to provide peak power typically employed in vehicles powered by fuel cells. More particularly, vehicles powered by fuel cells typically include complex systems to progressively increase the power output of the fuel cells (e.g., 0 to 100 percent of the rated output) in response to an operator's manipulation of a throttle. The fuel cells of the electric vehicle implementations described herein are designed to regularly operate in their peak fuel efficiency output range (with two exceptions to be described in more detail later) and so the output of the fuel cells is not being constantly changed to operate the electric vehicle. It is believed operating the fuel cells in their optimal fuel efficiency range will not only reduce fuel cost and reduce refueling needs, but also reduce fuel cell maintenance and replacement intervals by as much as 30% to 50%. Furthermore, sizing the fuel cells to be no larger than that required to produce an electric power output within the fuel cells maximum fuel efficiency range approximately equal to an anticipated average electric power requirement of the electric vehicle over a projected work cycle of the electric vehicles is advantageous because larger fuel cells would be heavier and so require more fuel to move the vehicle, and because larger fuel cells would produce more heat that would require additional expenditures of fuel to cool the fuel cells. Likewise sizing the batteries to be no larger than that required to provide electric power up to approximately an anticipated maximum power draw over the anticipated work cycle of the electric vehicle is advantageous because more or larger batteries would be heavier and so require more fuel to move the vehicle.

Depending on the storage capacity of the fuel storage tanks, the fuel may have to be refilled during the electric vehicle's work cycle, but the batteries will not have to be externally recharged. This is advantageous because refueling is relatively quick in comparison to externally recharging the batteries. Further, in the case of hydrogen fuel cells, green hydrogen gas is available to further reduce the environmental impact. Green hydrogen is hydrogen produced by electrolysis of water that is powered entirely by renewable energy. As such no polluting emissions are generated. It is noted that for the sake of convenience, the term "tanks" will be used in the descriptions to follow to refer to one or more fuel storage tanks even though the term is plural.

Another advantage realized by the electric vehicle implementations described herein is the lengthening of the expected lifetime of the rechargeable batteries. It is believed that battery longevity, measured by years of operation, would increase by a factor of two because the batteries will not experience degradation from frequent charging and draining. Yet another major advantage of the above-described system is that recharging the battery system using the output of the fuel cells eliminates the need to leave the operating area periodically to recharge. When an electric vehicle is out of service for external recharging (or battery exchange), it is not available to perform its primary function, and so it is often necessary to buy and maintain extra pieces of equipment for times when an electric vehicle must leave to charge. The downtime and increased infrastructure costs are eliminated by the electric vehicle implementations described herein.

Further, the electric vehicle implementations described herein will lengthen hours of operation and improve user acceptance of equipment to eliminate greenhouse gas and harmful emissions. By eliminating usage disruptions to recharge the batteries and reducing fuel costs, users are incentivized to transition to zero-emission. Thus, emissions of carbon dioxide gas and particulates will be virtually eliminated. When green hydrogen is used, the operating emissions will be zero.

2.0 Electric Vehicle System

FIG. 1 illustrates an exemplary system diagram for the electric vehicle implementations described herein. In particular, the system diagram of FIG. 1 illustrates the interrelationships between various elements of the electric vehicle. While the system diagram of FIG. 1 illustrates a high-level view of the vehicle implementations described herein it is not intended to provide an exhaustive or complete illustration of every possible implementation, nor is it intended to suggest any limitation as to the scope of use or functionality of the electric vehicle.

As exemplified in FIG. 1, the electric vehicle includes the following components. At the hub of the system is an electric power distribution component 102 that is electrically connected to (via the solid line connectors 116 in FIG. 1) and which provides electric energy to other electric powered systems and components of the electric vehicle including an electric powered propulsion system 104 that propels the electric vehicle, additional electric powered systems 106 (as will be described in more detail in sections to follow), a bank of rechargeable batteries 108 whenever the batteries are in a recharge mode, and an electric vehicle controller 110. In addition, the distribution component 102 is electrically connected to (via the solid line connectors 118 in FIG. 1) and receives electric power from one of more fuel cells 112 and the rechargeable batteries 108 whenever the batteries are operating in a discharge mode. In one implementation, the connectors 118 take the form of electric wires or cables.

As further shown in FIG. 1, each of the vehicle's electric powered systems and components (e.g., 102, 104, 106, 108, 112) includes one or more sensors 114 that form a suite of sensors. For example, in one implementation the suite of sensors includes at least one state of charge sensor that measures the state of charge of the rechargeable batteries, and a plurality of electric power sensors that measure the amount of electric power being drawn by the electric powered systems and components of the electric vehicle, as well as the rechargeable batteries when the batteries are in the recharge mode. In one implementation shown in FIG. 1, the sensors 114 are in communication with the electric vehicle controller 110 via the electric power distribution component using two-way communication links 120 (shown as dotted line connectors in FIG. 1). In an alternate implementation (not shown in FIG. 1), the sensors are in communication with the electric vehicle controller directly using two-way communication links. In one implementation, the connectors 120 take the form of a wired connection employing electric wires or cables. In an alternate implementation, one or more of the connectors 120 take the form of wireless connections (e.g., via radio frequency, infrared, ultrasound, and so on).

The electric power distribution component 102 is made up of a plurality of switches and relays which are controlled by the electric vehicle controller 110. In general, the electric power distribution component 102 receives electric energy from the fuel cells 112, and the rechargeable batteries 108 when they are in discharge mode, and routes it to the electric powered systems and components of the electric vehicle. In addition, when the rechargeable batteries 108 are in the recharge mode, the electric power distribution component 102 receives electric energy from the fuel cells 112, and routes a portion of it to rechargeable batteries 108.

Referring again to FIG. 1, the fuel cells 112 consume a gaseous fuel stored in the onboard fuel tanks 122 which is delivered via a fuel input line 124, to produce electric energy. For example, in one implementation, the fuel cells are hydrogen consuming fuel cells, and the gaseous fuel is hydrogen. Typically, the fuel is stored under pressure in the onboard fuel tanks, and the size and number of tanks is chosen to allow the electric vehicle to operate for a significant amount (if not all) of the electric vehicle's anticipated work cycle. This is balanced against the practicalities (such as safety owing to the gaseous fuel being under pressure, weight, physical room to carry the tanks, and so on) of carrying pressurized fuel tanks on board the electric vehicle.

An example of a hydrogen fuel cell that can be employed alone or in multiples depending on the electric power requirement of the vehicle is Loop Energy, Inc.'s S300-S Fuel Cell System. More particularly, in the electric vehicle implementations described herein, the fuel cells 112 are sized to produce an electric power output within the fuel cells maximum fuel efficiency range that approximately equals an anticipated average electric power requirement of the electric vehicle over a projected work cycle of the electric vehicle. In general, the electric vehicle's work cycle provides information about the anticipated power requirements of the electric vehicle over the course of a prescribed time period (such as a day, the duration of a work shift, and so on). For example, the work cycle may indicate times during the prescribed time period that the electric vehicle is expected to be idle in that it does not need to move from one location to another or perform any work. Thus, the power requirements are minimal during such periods of time.

As indicated previously, the bank of rechargeable batteries 108 provide electric energy during a discharge mode and stores electric energy during a charging mode. An example of rechargeable batteries that can be employed is Xos Fleet, Inc.'s model BA03 and the number of batteries in the bank of rechargeable batteries depends on the electric power requirements of the electric vehicle. In one implementation, the rechargeable batteries 108 are sized to provide electric power up to an anticipated maximum power draw over the anticipated work cycle of the electric vehicle.

2.1 System Monitor

Referring again to FIG. 1, the electric vehicle implementations described herein can optionally include a system monitor 136 that includes at least one display and various user input devices, and which is in two-way communication with the electric vehicle controller 110. The optional nature of the system monitor 136 is shown in FIG. 1 by the use of a broken line box.

In one implementation, the system monitor is incorporated into the electric vehicle. In this implementation, the system monitor is in two-way communication with the electric vehicle controller via a wired connection, although in an alternate version it could communicate via a wireless connection (e.g., using RF or IR). In another implementation, the system monitor is a stand-alone device located remotely from the electric vehicle. In this later implementation, the system monitor is in two-way communication with the electric vehicle controller via a wireless connection either locally (using RF or IR or a local intranet) or from anywhere using a computer network connection such as the Internet.

In general, the system monitor 136 receives information about the status of the electric vehicle from the electric vehicle controller 110 via the electric vehicle control computer program (202 in FIG. 2). The system monitor allows an operator to observe the electric vehicle's status on the monitor's display. For example, the status can include the current electric power draw of the electric powered systems and components of the electric vehicle, as well as the electric power being output by the fuel cells and rechargeable batteries. In addition, readouts from the various sensors can be displayed to the operator. The predicted time remaining until the electric vehicle will need refueling can also be displayed. This predicted time remaining until refueling will be described in more detail in a section to follow.

The system monitor can also be employed to input data and instructions, set parameters, make changes, and add new features to the electric vehicle control computer program. This can include making changes regarding the anticipated work cycle of the electric vehicle.

2.2 Electric Vehicle Computer Program and Sub-Programs

Referring to FIG. 2, the electric vehicle controller 200 is made up of one or more computing devices (such as those described in Section 6.0 of this description) and runs an electric vehicle control computer program 202 that includes a plurality of sub-programs executable by the computing device or devices of the controller. Referring again to FIG. 1, in general the sub-programs configure the computing device or devices to monitor the amount of electric power provided to the various electric powered systems and components (e.g., 102, 104, 106) of the electric vehicle, and the rechargeable batteries 108 whenever the batteries are in the recharge mode, using the output from the electric power sensors 114, and to control the amount of electric power output from the fuel cells 112 and the rechargeable batteries 108 whenever the batteries are in discharge mode.

2.2.1 Monitoring and Control Sub-Programs

More particularly, referring to FIG. 3, in one implementation, the sub-programs of the electric vehicle control computer program for monitoring and controlling the electric vehicle 300 include a fuel cell control sub-program 302 that controls the electric power output from the fuel cells at a rate that is equal to or less than the rate at which the fuel cells are operating at maximum fuel efficiency. In implementations employing hydrogen fuel cells, the maximum fuel efficiency is typically in a range of approximately 40% to 50% of a maximum electric power output rating of the hydrogen fuel cells. It is noted that the fuel cells are sized as described previously so that the average electric power requirement of the electric vehicle over the course of its work cycle falls within the fuel cell's maximum fuel efficiency range. Thus, when the fuel cells are operating in their maximum fuel efficiency range, they are providing electric power that will cover the average power requirements of the electric vehicle. Typically, the electric vehicle's fuel cells are continuously operated in this maximum fuel efficiency range. The fuel cells are only operated at power output rates outside the rate at which the fuel cells are operating at maximum fuel efficiency in certain circumstances that will be described in more detail in sections to follow.

The monitoring and controlling sub-programs also include an electric power draw monitoring sub-program 304 that monitors the electric power being drawn by the electric powered systems and components of the electric vehicle, as well as a rechargeable batteries output control sub-program 306 that controls the electric power output from the rechargeable batteries. More particularly, the rechargeable batteries output control sub-program 306 controls the electric power output from the rechargeable batteries to provide electric power to the electric power distribution component for distribution to the electric powered systems and components of the electric vehicle during times when the electric power being drawn by electric powered systems and components of the electric vehicle exceeds the electric power being provided by the fuel cells and the state of charge of the rechargeable batteries is within a prescribed range. In one implementation employing lithium-ion rechargeable batteries, the prescribed range of the state of charge of the rechargeable batteries is between approximately 30% and 80% as this is the range that maximizes the longevity of the batteries. If other types of rechargeable batteries are employed in the electric vehicle, the maximum longevity range may be different.

Still referring to FIG. 3, the monitoring and controlling sub-programs further include a rechargeable batteries recharge sub-program 308 that controls the electric power distribution component to provide electric power from the fuel cells to the rechargeable batteries whenever the rechargeable batteries are not providing electric power to the electric power distribution component and the state of charge of the rechargeable batteries is less than a maximum state of charge. The rechargeable batteries recharge sub-program 308 also ceases providing electric power from the fuel cells to the rechargeable batteries whenever the state of charge of the rechargeable batteries reaches the maximum state of charge.

2.2.2 Fuel-Related Sub-Programs

As described previously, the fuel cells are sized to provide an amount of power approximately equal to the expected average power requirements of the electric vehicle over the course of its work cycle while operating in their highest fuel efficiency range, and the rechargeable batteries are sized to provide a maximum power output approximately equal to the peak power requirements expected to be encountered by the electric vehicle over the course of its work cycle while being maintained at a state of charge in their optimal longevity range. Given the power requirements of the electric vehicles anticipated work cycle, it is advantageous to employ enough fuel tanks so that their storage capacity is sufficient to cover the entirety of the work cycle without refilling. However, this may not always be possible, and the electric vehicle will need to be refueled before the work cycle is completed. In such situations, it is advantageous to monitor the amount of fuel remaining in the fuel tanks and to predict when the electric vehicle will need to be refueled.

To this end, in one implementation, the electric vehicle computer program also includes sub-programs for monitoring the amount of fuel in the onboard fuel tanks and predicting when additional fuel will be needed. As indicated above, these fuel-related sub-programs are particularly advantageous when it is probable that the electric vehicle will not be able to carry enough fuel to cover the electric vehicle's electric power requirements for the entire anticipated work cycle. More particularly, referring to FIG. 4, the fuel-related subprograms 400 include a work cycle data input sub-program 402 that inputs data indicative of an anticipated work cycle for the electric vehicle. As indicated previously, the anticipated work cycle includes information about the anticipated electric power requirements of the electric vehicle over the course of the work cycle.

Referring once again to FIG. 1, the data indicative of an anticipated work cycle for the electric vehicle is input to the electric vehicle controller 110 via a two-way communication link 138. In general, the data is input from an onboard or remote computing device. In one implementation, the anticipated work cycle data is input by a user via the system monitor 136. In alternate implementations, the anticipated work cycle data is input by a user either locally via any appropriate input device associated with the electric vehicle controller, or remotely via a wireless communication module associated with the electric vehicle controller. In one implementation, the anticipated work cycle data is generated ahead of time based on observations of typical work cycles of a vehicle that the electric vehicle described herein is replacing. It has been found that for many applications, the work cycle of a vehicle is substantially consistent from one cycle to the next, making such a vehicle a good candidate for replacement by the electric vehicle implementations described herein.

The fuel-related sub-programs also include a fuel monitoring sub-program 404 that monitors the amount of fuel in the onboard fuel tanks. To this end, a fuel sensor whose output is indicative of the amount of fuel in the onboard fuel tank is included in the aforementioned suite of sensors (as exemplified by fuel sensor 126 in the exemplary implementation of FIG. 1). The fuel sensor is in communication with the electric vehicle controller via the fuel cells and the electric power distribution component using two-way communication links (as shown by the dotted line connectors 120 in FIG. 1). In an alternate implementation (not shown in FIG. 1), the fuel sensor is in communication with the electric vehicle controller directly using a communication link.

Additionally, a fuel refill prediction sub-program 406 is included that predicts when additional fuel will need to be added to the onboard fuel tanks to keep the fuel cells in operation during the anticipated work cycle based on the anticipated electric power requirements of the electric vehicle over the work cycle and the actual rate of consumption of the fuel. If the actual rate of fuel consumption differs from the anticipated rate of consumption, the predicted time until refilling the fuel tanks can be adjusted accordingly.

A predicted time until refueling dissemination sub-program 408 is included in the fuel-related sub-programs that provides data indicative of the time remaining until additional fuel will need to be added to the onboard fuel tanks to keep the fuel cells in operation during the anticipated work cycle to one or more users. For example, the one or more users can include at least one of an onboard operator of the electric vehicle, or a remote operator of the electric vehicle in cases where the electric vehicle is a remote-controlled vehicle that is being operated remotely, or any other person that has a need for the information and is authorized to received such information.

While factoring in variations in the actual fuel consumption rate versus the anticipated rate based on the anticipated work cycle can be handled as described above for most variations, larger excursions owing to a significant change in the anticipated work cycle during operation of the electric vehicle can be more advantageously handled by inputting data indicative of a change to the anticipated work cycle for the electric vehicle. Accordingly, referring to FIG. 5, in one implementation a revised work cycle data input sub-program 502 is included in additional fuel-related sub-programs 500. This revised work cycle data input sub-program 502 inputs data indicative of a change to the anticipated work cycle for the electric vehicle. The revised work cycle includes revised anticipated electric power requirements of the electric vehicle over the remaining course of the work cycle.

The additional fuel-related sub-programs 500 also include a fuel monitoring sub-program 504 that continues to monitor the amount of fuel in the onboard fuel tanks, and a fuel refill prediction sub-program 506 that predicts when additional fuel will need to be added to the onboard fuel tanks to keep the fuel cells in operation during the remainder of the work cycle based on the revised anticipated electric power requirements of the electric vehicle over the remaining course of the work cycle and the actual rate of consumption of the fuel. As before, if the actual rate of fuel consumption differs from the anticipated rate of consumption, the predicted time until refilling the fuel tanks can be adjusted accordingly. A predicted time until refueling dissemination sub-program 506 is included in the additional fuel-related sub-programs as well. This sub-program 506 provides data indicative of the time remaining until additional fuel will need to be added to the onboard fuel tanks to keep the fuel cells in operation during the remainder of the work cycle to the aforementioned one or more users.

2.2.3 Temperature-Related Sub-Programs

The fuel cells typically operate best within a prescribed fuel cell operating temperature range that can vary from one type of fuel cell to another. Likewise, the rechargeable batteries typically operate best within a prescribed rechargeable battery operating temperature range. Accordingly, when the fuel cells, or the rechargeable batteries, are heated to temperatures above their respective operating temperature ranges, these components need to be cooled. It is noted that the fuel cells, or the rechargeable batteries, can become overheated as a consequence of their operation (e.g., fuel cells produce both heat and electricity during their operation), or due to the ambient temperature, or both. To this end, in one implementation (such as the exemplary implementation depicted in FIG. 1), the electric vehicle further includes electric powered cooling components 128 for cooling the fuel cells 112 to a temperature within the prescribed operating temperature range of the fuel cells, and cooling the rechargeable batteries 108 to a temperature within the prescribed operating temperature range of the rechargeable batteries. Similarly, in one implementation (such as the exemplary implementation depicted in FIG. 1), the electric vehicle further includes electric powered heating components 130 for heating the fuel cells 112 to a temperature within the prescribed operating temperature range of the fuel cells, and heating the rechargeable batteries 108 to a temperature within the prescribed operating temperature range of the rechargeable batteries.

In implementations where the fuel cells and the rechargeable batteries are heated or cooled, the electric power requirements of this heating and cooling need to be accounted for in determining when the onboard fuel tanks require refilling. Various temperature-related sub-programs are employed to accomplish this task. More particularly, referring to FIG. 6, in one implementation, the electric vehicle computer program also includes temperature-related sub-programs 600 for determining when the fuel tanks require refueling in situations where the fuel cells and/or the rechargeable batteries are being heated or cooled. For example, the temperature-related subprograms include a work cycle data input sub-program 602 that inputs data indicative of an anticipated work cycle for the electric vehicle. As indicated previously, the anticipated work cycle includes information about the anticipated electric power requirements of the electric vehicle over the course of the work cycle.

The temperature-related sub-programs also include a fuel monitoring sub-program 604 that monitors the amount of fuel in the onboard fuel tanks, and the operating temperatures of the fuel cells and the rechargeable batteries. To this end, a fuel sensor whose output is indicative of the amount of fuel in the onboard fuel tank, a fuel cell temperature sensor whose output is indicative of the operating temperature of the fuel cells, and a rechargeable battery temperature sensor whose output is indicative of the operating temperature of the rechargeable batteries are included in the aforementioned suite of sensors (as exemplified by fuel sensor 126, fuel cell temperature sensor 132 and rechargeable battery temperature sensor 134 in the exemplary implementation of FIG. 1). The foregoing sensors 126, 132, 134 are in communication with the electric vehicle controller via the fuel cells and rechargeable batteries, and via the electric power distribution component using two-way communication links (as shown by the dotted line connectors 120 in FIG. 1). In an alternate implementation (not shown in FIG. 1), these sensors are in communication with the electric vehicle controller directly using two-way communication links.

A fuel refill prediction sub-program 606 is included that predicts when additional fuel will need to be added to the onboard fuel tanks to keep the fuel cells in operation during the anticipated work cycle based on the anticipated electric power requirements of the electric vehicle over the work cycle, and the actual rate of consumption of the fuel which includes the electric power requirements of any unexpected heating or cooling required to keep the fuel cells and the rechargeable batteries within their respective prescribed operating temperature ranges. As described previously, if the actual rate of fuel consumption differs from the anticipated rate of consumption, the predicted time remaining until refilling the fuel tanks can be adjusted accordingly.

A predicted time until refueling dissemination sub-program 608 is included in the temperature-related sub-programs that provides data indicative of the time remaining until additional fuel will need to be added to the onboard fuel tanks to keep the fuel cells in operation during the anticipated work cycle to the aforementioned one or more users.

2.2.4 Battery Preservation Sub-Programs

Optimally, the fuel cells, rechargeable batteries, and fuel tanks are sized as described previously so as to allow the fuel cells to operate in their peak fuel efficiency range while keeping the rechargeable batteries charged within their maximum longevity range and while having enough onboard fuel to last an entire work cycle without refueling. However, circumstances such as extreme ambient temperatures requiring unanticipated additional electric power for heating or cooling the fuel cells and rechargeable batteries to keep them in their operating temperature ranges, and/or unexpected changes in the anticipated work cycle that result in electric power requirements that exceed the anticipated requirements (e.g., longer than anticipated drive distances, or more than the anticipated amount of work such as heavier than anticipated loads that have to be transported or lifted), and so on, can occur.

Figure 7:
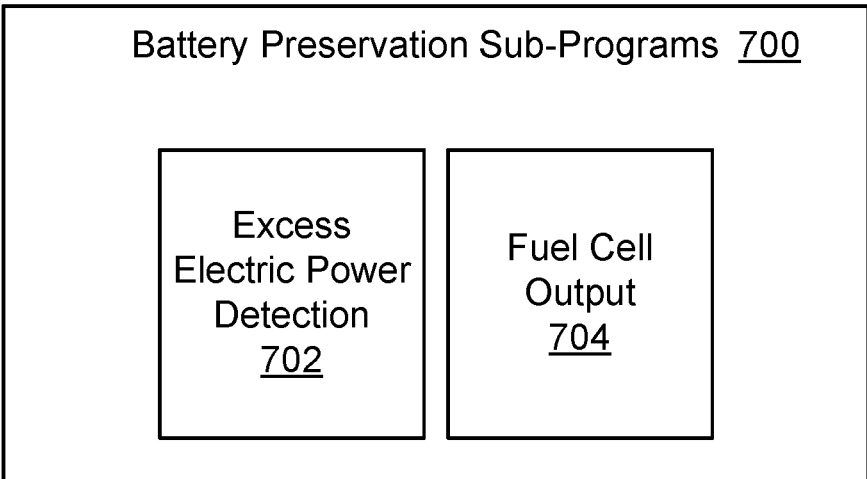
FIG. 7 is a diagram illustrating one implementation, in simplified form, of battery preservation sub-programs of the electric vehicle control computer program.

When the foregoing unanticipated circumstances occur, it may be advantageous to deviate from operating the fuel cells in their optimum fuel efficiency range. More particularly, in one implementation, the electric vehicle computer program also includes battery preservation sub-programs for controlling the fuel cells. For example, referring to FIG. 7, the battery preservation sub-programs 700 include an excess electric power detection sub-program 702 that detects if the electric power provided by the fuel cells (while operating in their peak fuel efficiency range) plus the electric power provided by the rechargeable batteries is needed to cover the electric power requirements of the vehicle, and the state of charge of the rechargeable batteries has dropped to a prescribed minimum state of charge threshold within their longevity range. If so, a fuel cell output sub-program 704 increases the output from the fuel cells to a point above their peak fuel efficiency range to cover the power requirements and recharge the batteries to keep them in their maximum longevity range. As such, the longevity of the rechargeable batteries is given priority in this implementation, even though it may require an unanticipated or earlier refueling event. It is noted, however, that any increase of the fuel cells' output above their maximum fuel efficiency range is limited to a point no greater than about 80 percent of the fuel cells' maximum rated output so as to not adversely affect the longevity of the fuel cells.

2.2.5 Fuel Conservation Sub-Programs

As indicated previously, circumstances can occur that cause the electric vehicle's fuel supply to be used faster than expected. While refueling is always an option when such circumstances occur, the expense associated with using extra fuel and the downtime required to refuel the electric vehicle can be avoided or at least reduced by employing fuel conservation measures.

Figure 8:
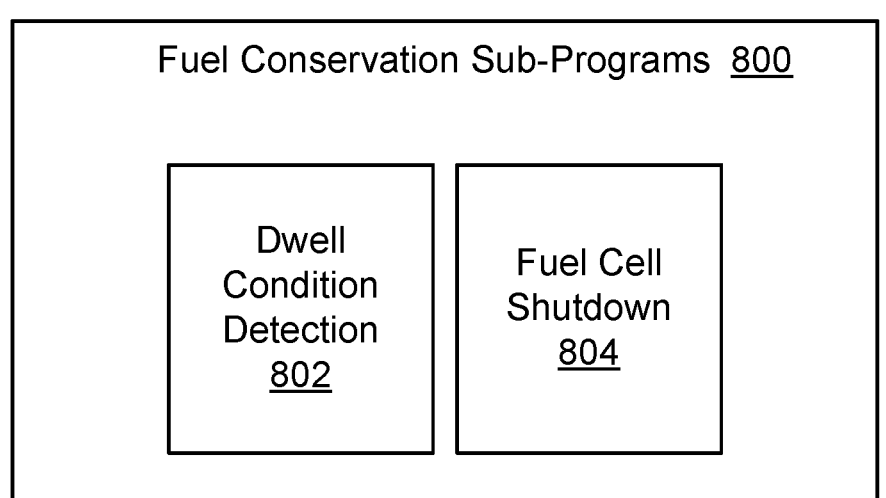
FIG. 8 is a diagram illustrating one implementation, in simplified form, of fuel conservation sub-programs of the electric vehicle control computer program.

In one implementation, the electric vehicle computer program also includes fuel conservation sub-programs for controlling the fuel cells when the electric vehicle is deemed to be in a dwell condition. For example, referring to FIG. 8, the fuel conservation sub-programs 800 include a dwell condition detection sub-program 802 that determines if the anticipated electric power requirements of the electric vehicle over the course of the work cycle and the monitored electric power drawn by the electric powered systems and components of the electric vehicle indicate the electric vehicle is in a dwell condition. If so, a fuel cell shutdown sub-program 804 shuts down the fuel cells for the duration of the dwell condition. This saves fuel that would have otherwise been consumed by the fuel cells. The saved fuel can be used to cover circumstances where the actual fuel consumption during the work cycle exceeds the anticipated fuel consumption based on the anticipated work cycle.

For the purposes of this description and the claims to follow, a dwell condition can be generally defined as occurring when the state of charge of the rechargeable batteries is within their longevity range and the electric vehicle does not need the electrical power produced from the fuel cells to keep the vehicle operating. From a practical perspective, in one implementation, this general description would be modified so that the dwell operating mode is not initiated if the anticipated work cycle indicates that the current conditions that justify transitioning will not last long enough to save enough fuel to appreciably delay or eliminate the need to refuel.

3.0 Electric Vehicle Control Processes

FIG. 9 illustrates an exemplary implementation, in simplified form, of a process for controlling the operation of electric powered systems and components of an electric vehicle. The process illustrated in FIG. 9 can be realized on the system illustrated in FIG. 1. As exemplified in FIG. 9, the process includes controlling electric power output from one or more fuel cells (process action 900). As described previously, the fuel cells consume a gaseous fuel stored in one or more onboard fuel tanks to produce electric energy, and are sized to produce an electric power output within the fuel cells maximum fuel efficiency range that is approximately equal to an anticipated average electric power requirement of the electric vehicle over its projected work cycle. In process action 902, the electric power being drawn by the electric powered systems and components of the electric vehicle is monitored and in process action 904 the electric power output from rechargeable batteries that provide electric energy during a discharge mode is controlled. As described previously, the rechargeable batteries are sized to produce electric power up to an anticipated maximum power draw of the electric powered systems and components of the electric vehicle during times in the anticipated work cycle of the electric vehicle when electric power being drawn exceeds the electric power being provided by the fuel cells and the state of charge of the rechargeable batteries is within a prescribed range. Additionally, in process 906, the electric power provided from the fuel cells to the rechargeable batteries is controlled during a recharge mode so that power is provided whenever the rechargeable batteries are not providing electric power to the electric powered systems and components of the electric vehicle and the state of charge of the rechargeable batteries is less than a maximum state of charge. Further, in process action 908, the electric power produced by the fuel cells is not provided to the rechargeable batteries whenever the state of charge of the rechargeable batteries reaches the maximum state of charge.

Figure 10:
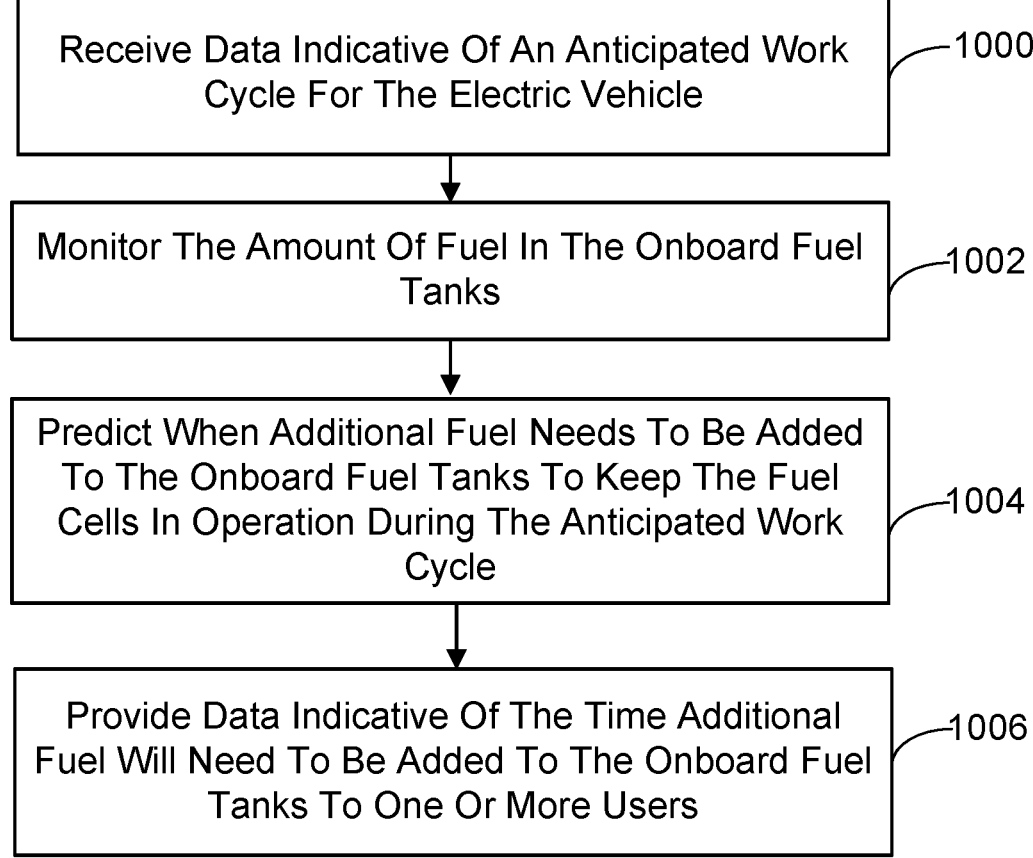
FIG. 10 is a flow diagram illustrating one implementation, in simplified form, of a process for fuel monitoring and predicting when additional fuel will be needed.

FIG. 10 illustrates an exemplary implementation, in simplified form, of a process for fuel monitoring and predicting when additional fuel will be needed. The process illustrated in FIG. 10 can be realized on the system illustrated in FIG. 1. As exemplified in FIG. 10, the process involves receiving data indicative of an anticipated work cycle for the electric vehicle (process action 1000). The anticipated work cycle data includes the anticipated electric power requirements of the electric vehicle over the course of the work cycle. In process action 1002, the amount of fuel in the onboard fuel tanks is monitored, and in process action 1004, it is predicted when additional fuel will need to be added to the onboard fuel tanks to keep the fuel cells in operation during the anticipated work cycle. This prediction is based on the anticipated electric power requirements of the electric vehicle over the work cycle and the actual rate of consumption of the fuel. In process action 1006, the data indicative of the time remaining until additional fuel will need to be added to the onboard fuel tanks is provided to one or more users. As described previously, the one or more users can include at least one of an onboard operator of the electric vehicle, or a remote operator of the electric vehicle in cases where the electric vehicle is a remote-controlled vehicle that is operated remotely, or any other person that has a need for the information and is authorized to received such information.

FIG. 11 illustrates an exemplary implementation, in simplified form, of a process for fuel monitoring and predicting when additional fuel will be needed as illustrated in FIG. 10, if a change occurs in the anticipated work cycle. The process illustrated in FIG. 11 can be realized on the system illustrated in FIG. 1. As exemplified in FIG. 11, the process involves receiving data indicative of a change to the anticipated work cycle for the electric vehicle (process action 1100). This data includes revised anticipated electric power requirements of the electric vehicle over the remaining course of the work cycle. In process action 1102, the amount of fuel in the onboard fuel tanks is monitored, and in process action 1104, it is predicted when additional fuel will need to be added to the onboard fuel tanks to keep the fuel cells in operation during the remainder of the work cycle based on the revised anticipated electric power requirements of the electric vehicle over the remaining course of the work cycle and the actual rate of consumption of the fuel. Then, in process action 1106, data indicative of the time remaining until additional fuel will need to be added to the onboard fuel tanks to keep the fuel cells in operation during the remainder of the work cycle is provided to the one or more users.

FIG. 12 illustrates an exemplary implementation, in simplified form, of a process for fuel monitoring and predicting when additional fuel will be needed as illustrated in FIG. 10, if the temperature of the fuel cells and the rechargeable batteries is taken into consideration. The process illustrated in FIG. 12 can be realized on the system illustrated in FIG. 1. As exemplified in FIG. 12, the process involves monitoring the amount of fuel in the onboard fuel tanks and the operating temperatures of the fuel cells and the rechargeable batteries (process action 1200). In process action 1202, it is predicted when additional fuel will need to be added to the onboard fuel tanks to keep the fuel cells in operation during the anticipated work cycle based on the anticipated electric power requirements of the electric vehicle over the work cycle, and the actual rate of consumption of the fuel including the electric power requirements of any heating or cooling required to keep the fuel cells and the rechargeable batteries within their respective prescribed operating temperature ranges. Then, in process action 1204, data indicative of the time remaining until additional fuel will need to be added to the onboard fuel tanks to keep the fuel cells in operation during the anticipated work cycle is provided to the one or more users.

FIG. 13 illustrates an exemplary implementation, in simplified form, of a process for controlling the fuel cells whenever the electric power provided by the fuel cells while operating in their peak fuel efficiency range, plus the electric power provided by the rechargeable batteries, is needed to cover the electric power requirements of the vehicle, and the state of charge of the rechargeable batteries drops to the minimum state of charge threshold within the batteries' longevity range. The process illustrated in FIG. 13 can be realized on the system illustrated in FIG. 1. As exemplified in FIG. 13, the process involves monitoring the electric power being drawn by the electric powered systems and components of the electric vehicle (process action 1300). It is then determined if a rechargeable battery longevity preservation condition exists (process action 1302). A rechargeable battery longevity preservation condition exists if the electric power provided by the fuel cells while operating in the peak fuel efficiency range, plus the electric power provided by the rechargeable batteries, is needed to cover the electric power requirements of the vehicle, and the state of charge of the rechargeable batteries drops to the minimum state of charge threshold within the longevity range of the rechargeable batteries. Whenever the rechargeable battery longevity preservation condition exists, the output from the fuel cells is increased above the peak fuel efficiency range of the fuel cells to cover the power requirements and recharge the rechargeable batteries to keep the batteries in the longevity range (process action 1304). If the rechargeable battery longevity preservation condition does not exist, the monitoring of the electric power being drawn by the electric powered systems and components of the electric vehicle continues. It is noted that in one implementation, the increase in the output from the fuel cells is limited to a point no greater than about 80 percent of the fuel cells' maximum rated output so as to not adversely affect the longevity of the fuel cells.

Figure 14:
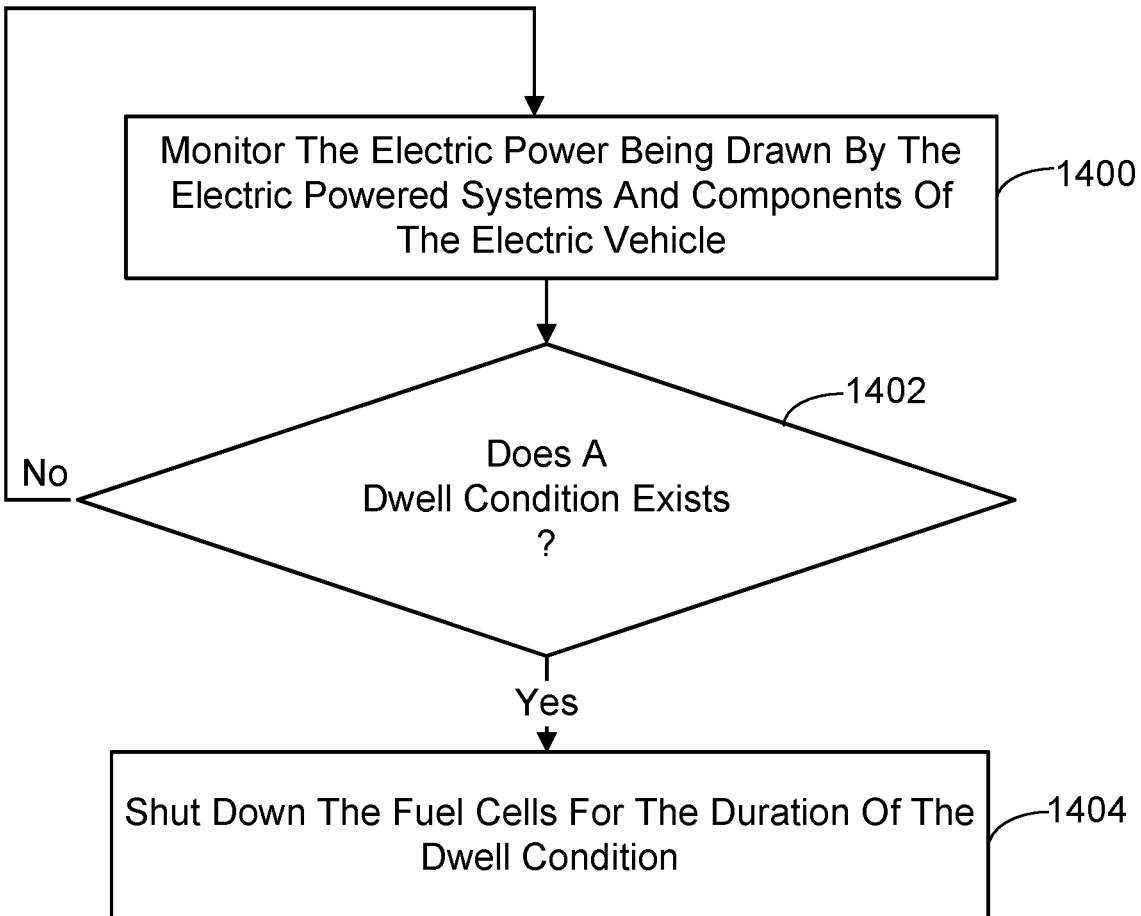
FIG. 14 is a flow diagram illustrating one implementation, in simplified form, of a process for controlling the fuel cells when the electric vehicle is deemed to be in a dwell condition.

FIG. 14 illustrates an exemplary implementation, in simplified form, of a process for controlling the fuel cells when the electric vehicle is deemed to be in a dwell condition. The process illustrated in FIG. 14 can be realized on the system illustrated in FIG. 1. As exemplified in FIG. 14, the process involves monitoring the electric power being drawn by the electric powered systems and components of the electric vehicle (process action 1400). It is then determined if the anticipated electric power requirements of the electric vehicle over the course of the work cycle and the monitored electric power drawn by the electric powered systems and components of an electric vehicle indicate the electric vehicle is in a dwell condition (process action 1402). When the electric vehicle is determined to be in a dwell condition, the fuel cells are shut down for the duration of the dwell period (process action 1404). If a dwell condition does not exist, the monitoring of the electric power being drawn by the electric powered systems and components of the electric vehicle continues.

4.0 Exemplary Electric Vehicle Applications

In general, the electric vehicle implementations described herein can take the form of any vehicle whose electric power requirements can be satisfied with fuel cells and batteries sized as described previously for optimum efficiency, and fuel storage tanks sized to provide enough fuel to run the vehicle without refueling for a period of time that is practical for the application. For example, the electric vehicle implementations described herein are ideal for zero emission mobile off-road equipment with a heavy-duty classification such as high-capacity material handling equipment and self-powered construction equipment. While the electric power requirements are typically large for these types of vehicles, their size allows for large fuel cells and battery banks to handle the large electric power requirements. However, smaller electric vehicles with smaller electric power requirements may also be candidates especially as future technology advancements are likely to bring smaller, lighter fuel cells with higher power outputs and smaller, lighter battery banks with larger electric energy storage capabilities and higher power outputs. Further, some fixed-in-place electric equipment (such as a large crane) could employ the electric vehicle implementations described herein. While typically such equipment would be connected to an external electric power source, in some circumstances (such as when external electric power is not available in a remote location or electric power is intermittent and not reliable) the electric vehicle implementations described herein could be used advantageously to run this fixed equipment.

4.1 Electric Powered Material Handling Vehicle

Figure 15:
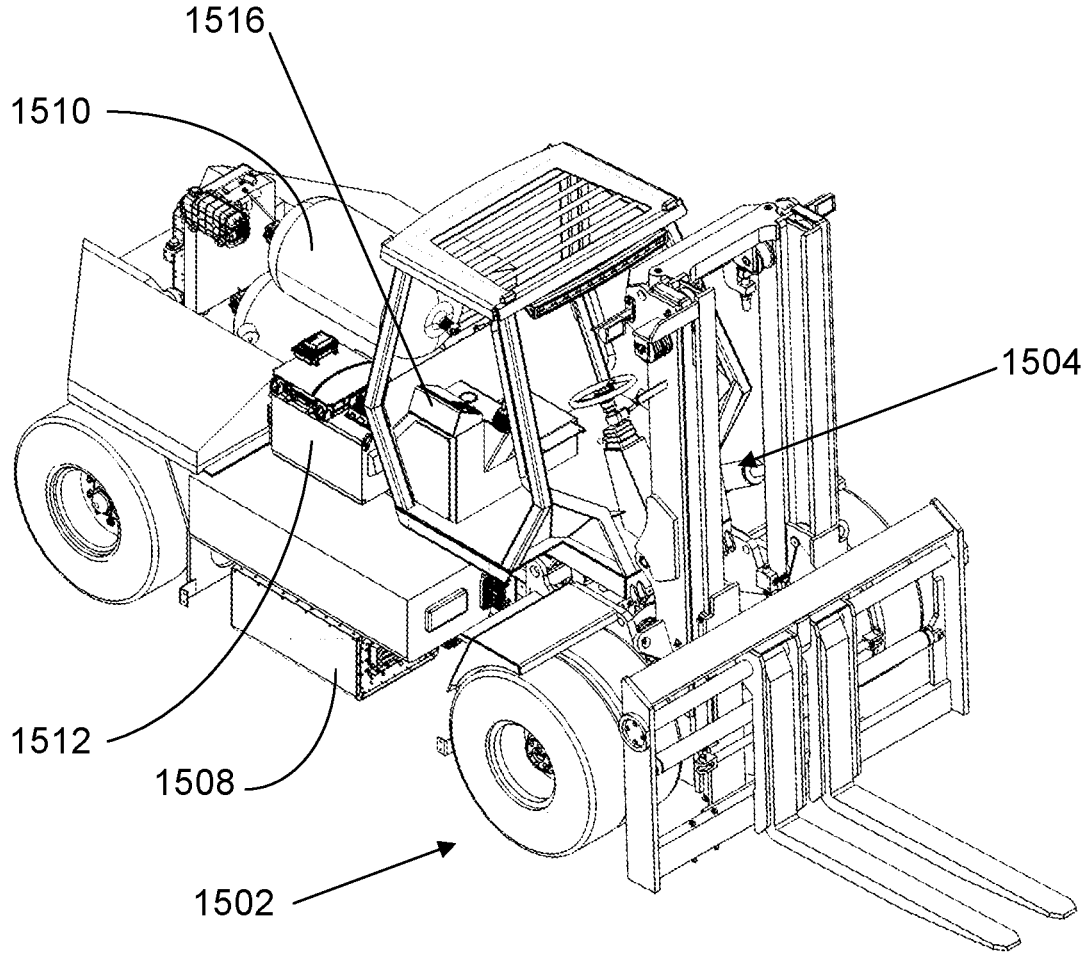
FIG. 15 is an exemplary diagram illustrating, in simplified form, one implementation of an electric powered material handling vehicle.

FIG. 15 depicts an example of one application that can advantageously employ the electric vehicle implementations described herein. Namely, an electric powered material handling vehicle.

Figure 16:
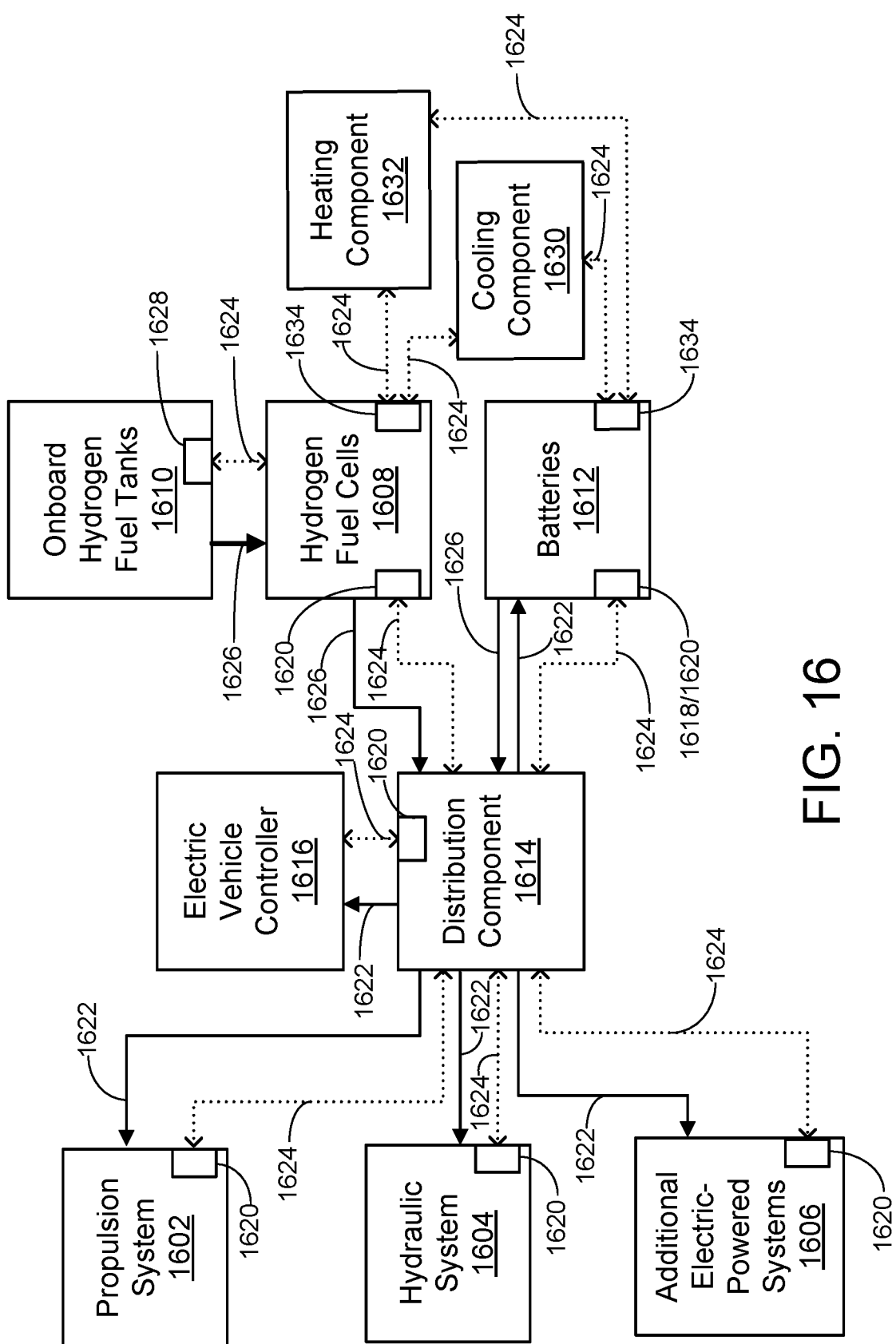
FIG. 16 is an exemplary diagram illustrating, in simplified form, one implementation of an electric powered material handling vehicle system.

Referring now to FIG. 16, built into one exemplary implementation of the electric powered material handling vehicle are various systems and components including an electric powered propulsion system 1602 (a portion of which is referenced as 1502 in FIG. 15) that propels the vehicle, an electric powered hydraulic system that drives hydraulic components of the vehicle 1604 (a portion of which is referenced as 1504 in FIG. 15), a plurality of additional electric powered systems 1606 that operate non-propulsion related and non-hydraulics related systems and components of the vehicle. In addition, the electric powered material handling vehicle includes one or more hydrogen fuel cells 1608 (which is referenced as 1508 in FIG. 15) that consume hydrogen gas stored in onboard hydrogen fuel tanks 1610 (a portion of which is referenced as 1510 in FIG. 15), and provided via a hydrogen gas line 1626, to produce electric energy. As described previously, the fuel cells are sized to produce an electric power output within the fuel cells maximum fuel efficiency range that is approximately equal to an anticipated average electric power requirement of the electric vehicle over a projected work cycle. The amount of hydrogen gas in the hydrogen fuel tanks 1610 is monitored using a hydrogen fuel tank sensor 1628 and this information is relayed via two-way electric connector 1624. In addition, rechargeable batteries 1612 (which is referenced as 1512 in FIG. 15) are included that provide electric energy during a discharge mode and store electric energy during a charging mode. As described previously, the rechargeable batteries 1612 are sized to provide electric power up to an anticipated maximum power draw over the anticipated work cycle of the vehicle. An electric power distribution component 1614 is included that is electrically connected to and which provides electric energy to the electric powered propulsion system 1602, the electric powered hydraulic system 1604, the additional electric powered systems 1606, the rechargeable batteries 1612 whenever the batteries are in the recharge mode, and an electric vehicle controller 1616. In addition, the electric power distribution component 1614 is electrically connected to and receives electric power from the fuel cells 1608, and the rechargeable batteries 1612 whenever the batteries are operating in the discharge mode. A suite of sensors is included that has at least one state of charge sensor 1618 that measures the state of charge of the rechargeable batteries, and a plurality of electric power sensors 1620 that measure the amount of electric power being drawn by the electric powered propulsion system 1602, electric powered hydraulic system 1604, additional electric powered systems 1606, the rechargeable batteries 1612 whenever the batteries are in the recharge mode, and the electric vehicle controller 1616. The aforementioned vehicle controller 1616 (a portion of which is referenced as 1516 in FIG. 15) includes one or more computing devices, that run a vehicle control computer program having a plurality of sub-programs executable by the computing device or devices. In general, the sub-programs configure the computing device or devices to monitor the amount of electric power provided to the electric powered propulsion system 1602, the electric powered hydraulic system 1604, the additional electric powered systems 1606, the rechargeable batteries 1612 whenever the batteries are in the recharge mode, and the electric vehicle controller 1616 via electric connectors 1622, using the output from the sensors 1618, 1620 via two-way electric connectors 1624, and to control the amount of electric power output from the fuel cells 1608 and the rechargeable batteries 1612 whenever the batteries are in discharge mode via electrical connectors 1626, using the output from the sensors 1620 via two-way electric connectors 1624. The electric powered material handling vehicle further includes electric powered cooling components 1630 for cooling the fuel cells 1608 to a temperature within the prescribed operating temperature range of the fuel cells and cooling the rechargeable batteries 1612 to a temperature within the prescribed operating temperature range of the rechargeable batteries. Similarly, the electric powered material handling vehicle includes electric powered heating components 1632 for heating the fuel cells 1608 to a temperature within the prescribed operating temperature range of the fuel cells and heating the rechargeable batteries 1612 to a temperature within the prescribed operating temperature range of the rechargeable batteries. Temperature sensors 1634 monitor the operating temperature of the fuel cells 1608 and rechargeable batteries 1612 and relay this information via two-way electric connectors 1624. Further, in one implementation, the additional electric powered systems that operate non-propulsion related and non-hydraulics related systems and components of the electric powered material handling vehicle include at least one of electric powered lighting components, and electric powered user interfaces such as gauges, indicator lights, a computer monitor, and computer input devices.

5.0 Other Advantages and Implementations

While the electric vehicle has been described by specific reference to implementations thereof, it is understood that variations and modifications thereof can be made without departing from the true spirit and scope of the system. By way of example but not limitation, while the electric vehicle described so far relied on external fuel sources to fill its fuel tanks, it is also possible to employ onboard fuel generators (such as a hydrogen gas generator) to supplement the electric vehicles fuel supply or to eliminate the need for external fuel sources.

Additionally, in cold weather the amount of energy that can be stored in the rechargeable batteries may be reduced significantly. For example, lithium-ion batteries operate best at room temperatures. However, if the ambient temperature is at or below freezing (i.e., about 32 degrees Fahrenheit) the storage capacity of the batteries drops precipitously and can be reduced by as much as 50 percent. Thus, if the electric vehicle is going to be operated in freezing temperatures, the rechargeable batteries need to be heated, preferably to their optimum operating temperature. This is the reason some implementations of the electric vehicle described previously have heating components associated with the rechargeable batteries. While these heating components were described as being electric powered components, in one implementation, the electric powered heating could be supplemented or eliminated by using the heat produced by the fuel cells. More particularly, fuel cells produce waste heat in addition to electric energy. This waste heat could be harnessed to heat the rechargeable batteries using an appropriate heat capture system. This, in turn, saves fuel that would have otherwise gone to heat the rechargeable batteries.

It is further noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

6.0 Exemplary Operating Environments

Figure 17:
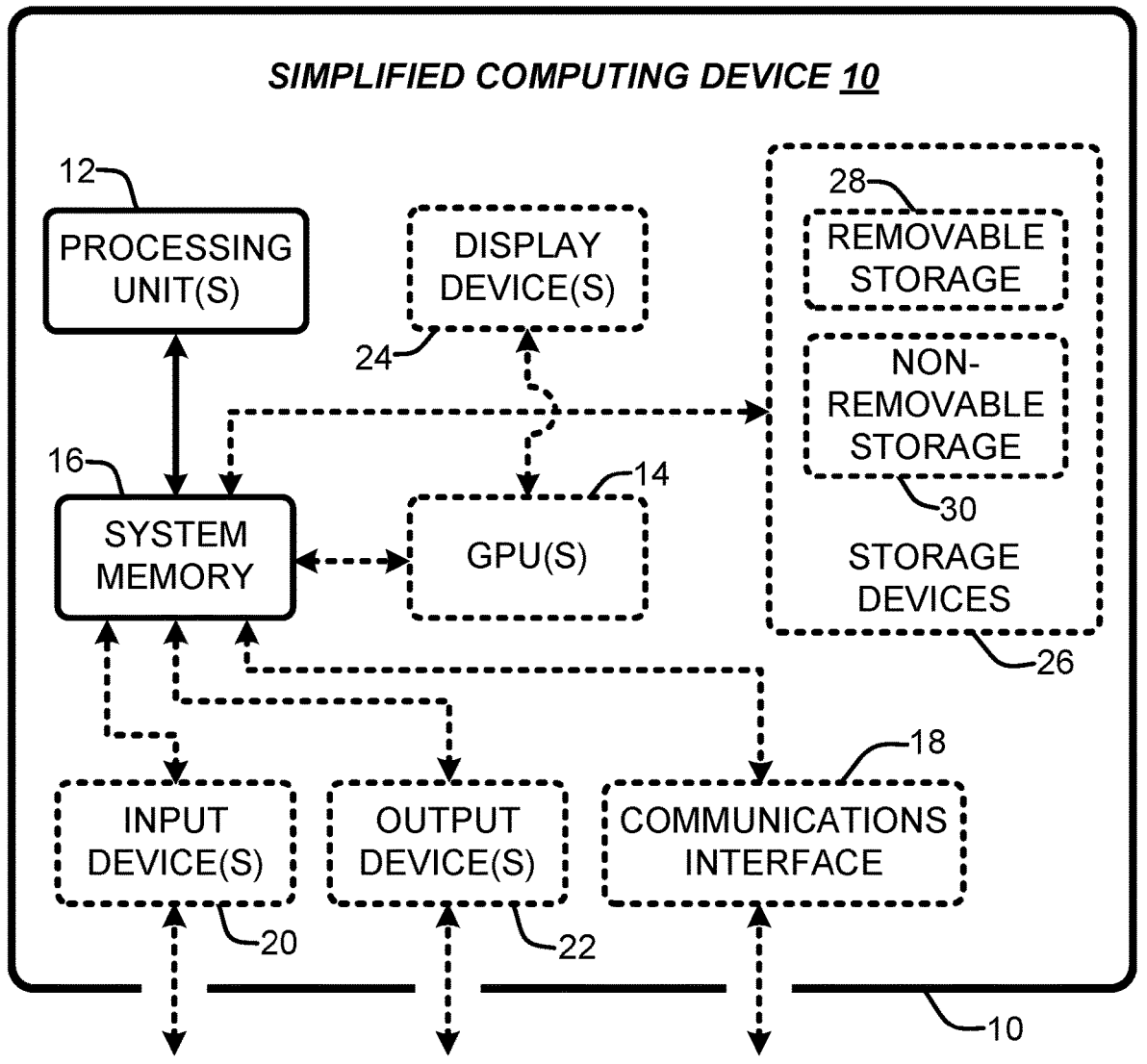
FIG. 17 is a diagram illustrating a simplified example of a general-purpose computer system on which various implementations and elements of the electric vehicle, as described herein, may be realized.

The electric vehicle controller implementations described herein are operational within numerous types of general purpose or special purpose computing system environments or configurations. FIG. 17 illustrates a simplified example of a general-purpose computer system on which various implementations and elements of the electric vehicle controller, as described herein, may be implemented. It is noted that any boxes that are represented by broken or dashed lines in the simplified computing device 10 shown in FIG. 17 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the electric vehicle controller implementations described herein, the device should have a sufficient computational capability and system memory to enable basic computational operations. In particular, the computational capability of the simplified computing device 10 shown in FIG. 17 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the electric vehicle controller implementations described herein, including input, output, control, feedback, and response to one or more users or other devices or systems associated with the electric vehicle controller implementations, are enabled by a variety of Natural User Interface (NUI) scenarios. The NUI techniques and scenarios enabled by the electric vehicle controller implementations include, but are not limited to, interface technologies that allow one or more users user to interact with the electric vehicle controller implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the electric vehicle controller implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the electric vehicle controller implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art and will not be described in detail herein.

The simplified computing device 10 shown in FIG. 17 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various electric vehicle controller implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The electric vehicle controller implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The electric vehicle controller implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor. Still further, the electric vehicle controller implementations described herein can be virtualized and realized as a virtual machine running on a computing device such as any of those described previously. In addition, multiple virtual machines can operate independently on the same computer device.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. An electric vehicle, comprising:
electric powered systems and components, comprising,
   an electric powered propulsion system that propels the electric vehicle; and
   a plurality of additional electric powered systems that operate non-propulsion related systems and components of the electric vehicle;
one or more fuel cells that consume a gaseous fuel stored in one or more onboard fuel tanks to produce electric energy, and which are sized to be no larger than that required to produce an electric power output within the fuel cells maximum fuel efficiency range approximately equal to an anticipated average electric power requirement of the electric vehicle over a projected work cycle of the electric vehicle;

rechargeable batteries that provide electric energy during a discharge mode and store electric energy during a charging mode, and which are sized to be no larger than that required to make up for a shortage in electric power required by the electric vehicle in periods when more than the anticipated average electric power requirement of the electric vehicle is needed up to approximately an anticipated maximum power draw over the anticipated work cycle of the electric vehicle;

an electric power distribution component that is electrically connected to and which provides electric energy to the electric powered systems and components of the electric vehicle, the rechargeable batteries whenever the batteries are in the recharge mode, and an electric vehicle controller, and additionally the electric power distribution component being electrically connected to and receiving electric power from the fuel cells and the rechargeable batteries whenever the batteries are operating in the discharge mode;

a suite of sensors comprising, at least one state of charge sensor that measures the state of charge of the rechargeable batteries, and a plurality of electric power sensors that measure the amount of electric power being drawn by the electric powered systems and components of the electric vehicle, and the rechargeable batteries whenever the batteries are in the recharge mode, and a fuel sensor whose output is indicative of the amount of fuel in the onboard fuel tanks; and the electric vehicle controller comprising one or more computing devices, and a non-transitory electric vehicle control computer program having a plurality of sub-programs executable by said computing device or devices, wherein the sub-programs configure said computing device or devices to, monitor the amount of electric power provided to the electric powered systems and components of the electric vehicle, and the rechargeable batteries whenever the batteries are in the recharge mode, using the output from the electric power sensors, and to control the amount of electric power output from the fuel cells and the rechargeable batteries whenever the batteries are in discharge mode, input data indicative of an anticipated work cycle for the electric vehicle which comprises the anticipated electric power requirements of the electric vehicle over the course of the work cycle, monitor the amount of fuel in the onboard fuel tanks, predict when additional fuel will need to be added to the onboard fuel tanks to keep the fuel cells in operation during the anticipated work cycle based on the anticipated electric power requirements of the electric vehicle over the work cycle and the actual rate of consumption of the fuel, provide data indicative of the time remaining until additional fuel will need to be added to the onboard fuel tanks to keep the fuel cells in operation during the anticipated work cycle to one or more users, control the electric power output from the fuel cells at a rate that is equal to or less than a rate at which the fuel cells are operating at maximum fuel efficiency, monitor the electric power being drawn by the electric powered systems and components of the electric vehicle, control the electric power output from the rechargeable batteries to provide electric power to the electric power distribution component for distribution to the electric powered systems and components of the electric vehicle during times when the electric power being drawn by the electric powered systems and components of the electric vehicle exceeds the electric power being provided by the fuel cells and the state of charge of the rechargeable batteries is within a prescribed range, and control the electric power distribution component to provide electric power from the fuel cells to the rechargeable batteries whenever the rechargeable batteries are not providing electric power to the electric power distribution component when the state of charge of the rechargeable batteries is less than a maximum state of charge, and cease providing electric power from the fuel cells to the rechargeable batteries whenever the state of charge of the rechargeable batteries reaches the maximum state of charge.

2. The electric vehicle of claim 1, wherein the maximum fuel efficiency of the fuel cell of cells is in a range of approximately 40% to 50% of a maximum electric power output rating of the fuel cells.

3. The electric vehicle of claim 1, wherein the prescribed range of the state of charge of the rechargeable batteries is between approximately 30% and 80%.

4. The electric vehicle of claim 1, wherein the suite of sensors is in communication with the electric power distribution component which is in turn in communication with the electric vehicle controller, and wherein the output from each sensor in the suite of sensors is provided to the electric vehicle controller via the electric power distribution device.

5. The electric vehicle of claim 1, wherein the suite of sensors is in direct communication with the electric vehicle controller, and wherein the output from each sensor in the suite of sensors is provided to the electric vehicle controller directly.

6. The electric vehicle of claim 1, wherein the sub-program controlling the amount of electric power output from the fuel cells, comprises controlling the electric power output from the fuel cells at a rate that is less than a rate at which the fuel cells are operating at maximum fuel efficiency whenever the anticipated electric power requirements of the electric vehicle over the course of the work cycle and the monitored electric power drawn by the electric powered systems and components of the electric vehicle indicate the electric vehicle is in a dwell condition.

7. The electric vehicle of claim 1, wherein the sub-programs for monitoring the amount of electric power provided to the electric powered systems and components of the electric vehicle, and the rechargeable batteries whenever the batteries are in the recharge mode, using the output from the electric power sensors, and controlling the amount of electric power output from the fuel cells and the rechargeable batteries whenever the batteries are in the discharge mode, comprise:

inputting data indicative of a change to the anticipated work cycle for the electric vehicle which comprises revised anticipated electric power requirements of the electric vehicle over the remaining course of the work cycle;

continue monitoring the amount of fuel in the onboard fuel tanks;

predicting when additional fuel will need to be added to the onboard fuel tanks to keep the fuel cells in operation during the remainder of the work cycle based on the revised anticipated electric power requirements of the electric vehicle over the remaining course of the work cycle and the actual rate of consumption of the fuel;

providing data indicative of the time remaining until additional fuel will need to be added to the onboard fuel tanks to keep the fuel cells in operation during the remainder of the work cycle to one or more users.

8. An electric vehicle, comprising:

electric powered systems and components, comprising, an electric powered propulsion system that propels the electric vehicle; and a plurality of additional electric powered systems that operate non-propulsion related systems and components of the electric vehicle;

one or more fuel cells that consume a gaseous fuel stored in one or more onboard fuel tanks to produce electric energy, and which are sized to be no larger than that required to produce an electric power output within the fuel cells maximum fuel efficiency range approximately equal to an anticipated average electric power requirement of the electric vehicle over a projected work cycle of the electric vehicle;

rechargeable batteries that provide electric energy during a discharge mode and store electric energy during a charging mode, and which are sized to be no larger than that required to make up for a shortage in electric power required by the electric vehicle in periods when more than the anticipated average electric power requirement of the electric vehicle is needed up to approximately an anticipated maximum power draw over the anticipated work cycle of the electric vehicle;

an electric power distribution component that is electrically connected to and which provides electric energy to the electric powered systems and components of the electric vehicle, the rechargeable batteries whenever the batteries are in the recharge mode, and an electric vehicle controller, and additionally the electric power distribution component being electrically connected to and receiving electric power from the fuel cells and the rechargeable batteries whenever the batteries are operating in the discharge mode;

electric powered cooling components for cooling the one or more fuel cells to a temperature within the prescribed operating temperature range of the fuel cells, and cooling the rechargeable batteries to a temperature within the prescribed operating temperature range of the rechargeable batteries;

electric powered heating components for heating the one or more fuel cells to a temperature within the prescribed operating temperature range of the fuel cells, and heating the rechargeable batteries to a temperature within the prescribed operating temperature range of the rechargeable batteries;

a suite of sensors comprising, at least one state of charge sensor that measures the state of charge of the rechargeable batteries, a plurality of electric power sensors that measure the amount of electric power being drawn by the electric powered systems and components of the electric vehicle, and the rechargeable batteries whenever the batteries are in the recharge mode, a fuel cell temperature sensor whose output is indicative of the operating temperature of the fuel cells, and a rechargeable battery temperature sensor whose output is indicative of the operating temperature of the rechargeable batteries; and the electric vehicle controller comprising one or more computing devices, and a non-transitory electric vehicle control computer program having a plurality of sub-programs executable by said computing device or devices, wherein the sub-programs configure said computing device or devices to, monitor the amount of electric power provided to the electric powered systems and components of the electric vehicle, and the rechargeable batteries whenever the batteries are in the recharge mode, using the output from the electric power sensors, control the amount of electric power output from the fuel cells and the rechargeable batteries whenever the batteries are in discharge mode, input data indicative of an anticipated work cycle for the electric vehicle which comprises the anticipated electric power requirements of the electric vehicle over the course of the work cycle, monitor the amount of fuel in the onboard fuel tanks and the operating temperatures of the fuel cells and the rechargeable batteries, predict when additional fuel will need to be added to the onboard fuel tanks to keep the fuel cells in operation during the anticipated work cycle based on the anticipated electric power requirements of the electric vehicle over the work cycle, and the actual rate of consumption of the fuel, and electric power requirements of any heating or cooling required to keep the fuel cells and the rechargeable batteries within their respective prescribed operating temperature ranges, provide data indicative of the time remaining until additional fuel will need to be added to the onboard fuel tanks to keep the fuel cells in operation during the anticipated work cycle to one or more users, control the electric power output from the fuel cells at a rate that is equal to or less than a rate at which the fuel cells are operating at maximum fuel efficiency, monitor the electric power being drawn by the electric powered systems and components of the electric vehicle, control the electric power output from the rechargeable batteries to provide electric power to the electric power distribution component for distribution to the electric powered systems and components of the electric vehicle during times when the electric power being drawn by the electric powered systems and components of the electric vehicle exceeds the electric power being provided by the fuel cells and the state of charge of the rechargeable batteries is within a prescribed range, and control the electric power distribution component to provide electric power from the fuel cells to the rechargeable batteries whenever the rechargeable batteries are not providing electric power to the electric power distribution component when the state of charge of the rechargeable batteries is less than a maximum state of charge, and cease providing electric power from the fuel cells to the rechargeable batteries whenever the state of charge of the rechargeable batteries reaches the maximum state of charge.

9. The electric vehicle of claim 8, wherein the electric vehicle further comprises heating components for heating the rechargeable batteries to a temperature within the prescribed operating temperature range of the rechargeable batteries, and wherein the heating component comprises sub-components that use heat produced by the fuel cell or cells to heat the rechargeable batteries.

10. A non-transitory computer-implemented process for controlling the operation of electric powered systems and components of an electric vehicle, the process comprising the actions of:

using one or more computing devices to perform the following process actions, the computing devices being in communication with each other whenever a plurality of computing devices is used:

controlling electric power output from one or more fuel cells that consume a gaseous fuel stored in one or more onboard fuel tanks to produce the electric energy, and which are sized to be no larger than that required to produce an electric power output within the fuel cells maximum fuel efficiency range approximately equal to an anticipated average electric power requirement of the electric vehicle over a projected work cycle of the electric vehicle;

monitoring the electric power being drawn by the electric powered systems and components of the electric vehicle;

controlling the electric power output from rechargeable batteries that provide electric energy during a discharge mode and store electric energy during a charging mode, and which are sized to be no larger than that required to make up for a shortage in electric power required by the electric vehicle in periods when more than the anticipated average electric power requirement of the electric vehicle is needed up to approximately an anticipated maximum power draw over the anticipated work cycle of the electric vehicle, to the electric powered systems and components of the electric vehicle during times when electric power being drawn by the electric powered systems and components exceeds the electric power being provided by the fuel cells and the state of charge of the rechargeable batteries is within a prescribed range; and controlling the electric power provided from the fuel cells to the rechargeable batteries whenever the rechargeable batteries are not providing electric power to the electric powered systems and components of the electric vehicle and the state of charge of the rechargeable batteries is less than a maximum state of charge and cease providing electric power from the fuel cells to the rechargeable batteries whenever the state of charge of the rechargeable batteries reaches the maximum state of charge;

receiving data indicative of an anticipated work cycle for the electric vehicle which includes the anticipated electric power requirements of the electric vehicle over the course of the work cycle;

monitoring the amount of fuel in the onboard fuel tanks;

predicting when additional fuel will need to be added to the onboard fuel tanks to keep the fuel cells in operation during the anticipated work cycle based on the anticipated electric power requirements of the electric vehicle over the work cycle and the actual rate of consumption of the fuel;

providing data indicative of the time remaining until additional fuel will need to be added to the onboard fuel tanks to keep the fuel cells in operation during the anticipated work cycle to one or more users:

controlling the electric power output from the fuel cells at a rate that is equal to or less than a rate at which the fuel cells are operating at maximum fuel efficiency;

monitoring the electric power being drawn by the electric powered systems and components of the electric vehicle;

controlling the electric power output from the rechargeable batteries to provide electric power to the electric powered systems and components of the electric vehicle during times when the electric power being drawn by the electric powered systems and components of the electric vehicle exceeds the electric power being provided by the fuel cells and the state of charge of the rechargeable batteries is within a prescribed range; and providing electric power from the fuel cells to the rechargeable batteries whenever the rechargeable batteries are not providing electric power to the electric powered systems and components of the electric vehicle and the state of charge of the rechargeable batteries is less than a maximum state of charge, and cease providing electric power from the fuel cells to the rechargeable batteries whenever the state of charge of the rechargeable batteries reaches the maximum state of charge.

11. The process of claim 10, further comprising process actions for:

receiving data indicative of a change to the anticipated work cycle for the electric vehicle which comprises revised anticipated electric power requirements of the electric vehicle over the remaining course of the work cycle;

predicting when additional fuel will need to be added to the onboard fuel tanks to keep the fuel cells in operation during the remainder of the work cycle based on the revised anticipated electric power requirements of the electric vehicle over the remaining course of the work cycle and the actual rate of consumption of the fuel;

providing data indicative of the time remaining until additional fuel will need to be added to the onboard fuel tanks to keep the fuel cells in operation during the remainder of the work cycle to one or more users.

12. The process of claim 10, wherein the process action for controlling the electric power output from the fuel cells comprises:

determining if the anticipated electric power requirements of the electric vehicle over the course of the work cycle and the monitored electric power drawn by the electric powered systems and components of an electric vehicle indicate the electric vehicle is in a dwell condition; and whenever the electric vehicle is determined to be in a dwell condition, shutting down the fuel cells for the duration of the dwell condition.

13. The process of claim 10, wherein the process action for controlling the electric power output from the fuel cells comprises:

determining if a rechargeable battery longevity preservation condition exists wherein the electric power provided by the fuel cells while operating in the peak fuel efficiency range plus the electric power provided by the rechargeable batteries is needed to cover the electric power requirements of the electric vehicle, and the state of charge of the rechargeable batteries drops to the minimum state of charge threshold within the longevity range of the rechargeable batteries; and whenever the rechargeable battery longevity preservation condition exists, increasing the output from the fuel cells above the peak fuel efficiency range of the fuel cells to cover the power requirements and recharge the rechargeable batteries to keep the batteries in the longevity range.

14. The process of claim 10, wherein the process further comprises process actions for:

monitoring the amount of fuel in the onboard fuel tanks and the operating temperatures of the fuel cells and the rechargeable batteries;

predicting when additional fuel will need to be added to the onboard fuel tanks to keep the fuel cells in operation during the anticipated work cycle based on the anticipated electric power requirements of the electric vehicle over the work cycle, and the actual rate of consumption of the fuel, and electric power requirements of any heating or cooling required to keep the fuel cells and the rechargeable batteries within their respective prescribed operating temperature ranges;

providing data indicative of the time remaining until additional fuel will need to be added to the onboard fuel tanks to keep the fuel cells in operation during the anticipated work cycle to one or more users; and controlling the electric power output from the fuel cells at a rate that is equal to or less than a rate at which the fuel cells are operating at maximum fuel efficiency.

15. An electric vehicle, comprising:

electric powered systems and components, comprising, an electric powered propulsion system that propels the electric vehicle; and a plurality of additional electric powered systems that operate non-propulsion related systems and components of the electric vehicle;

one or more fuel cells that consume a gaseous fuel stored in one or more onboard fuel tanks to produce electric energy, and which are sized to be no larger than that required to produce an electric power output within the fuel cells maximum fuel efficiency range approximately equal to an anticipated average electric power requirement of the electric vehicle over a projected work cycle of the electric vehicle;

rechargeable batteries that provide electric energy during a discharge mode and store electric energy during a charging mode, and which are sized to be no larger than that required to make up for a shortage in electric power required by the electric vehicle in periods when more than the anticipated average electric power requirement of the electric vehicle is needed up to approximately an anticipated maximum power draw over the anticipated work cycle of the electric vehicle;

an electric power distribution component that is electrically connected to and which provides electric energy to the electric powered systems and components of the electric vehicle, the rechargeable batteries whenever the batteries are in the recharge mode, and an electric vehicle controller, and additionally the electric power distribution component being electrically connected to and receiving electric power from the fuel cells and the rechargeable batteries whenever the batteries are operating in the discharge mode;

a suite of sensors comprising at least one state of charge sensor that measures the state of charge of the rechargeable batteries, and a plurality of electric power sensors that measure the amount of electric power being drawn by the electric powered systems and components of the electric vehicle, and the rechargeable batteries whenever the batteries are in the recharge mode; and the electric vehicle controller comprising one or more computing devices, and a non-transitory electric vehicle control computer program having a plurality of sub-programs executable by said computing device or devices, wherein the sub-programs configure said computing device or devices to, monitor the amount of electric power provided to the electric powered systems and components of the electric vehicle, and the rechargeable batteries whenever the batteries are in the recharge mode, using the output from the electric power sensors, control the amount of electric power output from the fuel cells and the rechargeable batteries whenever the batteries are in discharge mode, input data indicative of an anticipated work cycle for the electric vehicle which comprises the anticipated electric power requirements of the electric vehicle over the course of the work cycle, monitor the amount of fuel in the onboard fuel tanks, predict when additional fuel will need to be added to the onboard fuel tanks to keep the fuel cells in operation during the anticipated work cycle based on the anticipated electric power requirements of the electric vehicle over the work cycle and the actual rate of consumption of the fuel, and provide data indicative of the time remaining until additional fuel will need to be added to the onboard fuel tanks to keep the fuel cells in operation during the anticipated work cycle to one or more users.

* * * * *